United States Patent [19]

Hasegawa et al.

[11] Patent Number: 5,677,898
[45] Date of Patent: Oct. 14, 1997

[54] DISC CARTRIDGE CONTAINER AND APPARATUS HAVING A PLURALITY OF CARTRIDGES ARRANGED FOR SIMULTANEOUS SHUTTER OPENING CLOSING

[76] Inventors: Norio Hasegawa; Masayasu Itoh; Hideaki Kawashimo, all of c/o Sony Corporation, 7-35, Kitashinagawa 6-chome, Shinagawa-ku, Tokyo, Japan

[21] Appl. No.: 256,208

[22] PCT Filed: Sep. 30, 1993

[86] PCT No.: PCT/JP93/01405

§ 371 Date: May 31, 1994

§ 102(e) Date: May 31, 1994

[87] PCT Pub. No.: WO94/08339

PCT Pub. Date: Apr. 14, 1994

[30] Foreign Application Priority Data

Sep. 30, 1992 [JP] Japan ................ 4-261120

[51] Int. Cl.$^6$ .................................... G11B 23/023
[52] U.S. Cl. ............... 369/37; 206/308.3; 360/133; 369/291
[58] Field of Search ................ 369/37, 36, 75.2, 369/77.2, 291; 360/92, 132, 133, 98.04, 98.05, 98.06; 206/308.3, 308.1, 307.1

[56] References Cited

U.S. PATENT DOCUMENTS

| 4,471,394 | 9/1984 | Hapke | 360/92 |
| 4,860,136 | 8/1989 | Sasaki et al. | 360/99.05 |
| 5,082,131 | 1/1992 | Rauh et al. | 220/4.21 |
| 5,293,362 | 3/1994 | Sakurai et al. | 369/37 |
| 5,464,091 | 11/1995 | Callahan et al. | 206/308.3 |

FOREIGN PATENT DOCUMENTS 2212971  8/1989  United Kingdom ........... 360/106

Primary Examiner—Stuart S. Levy
Assistant Examiner—Kevin M. Watkins

[57] ABSTRACT

A disc recording and/or reproducing apparatus in which a cartridge container has a number of disc cartridges loaded internal sections without stacking of the disc cartridges by arraying the disc cartridges in one plane in a matrix configuration includes a rotation supporting substrate supporting a driving part supporting substrate carrying a disc rotation driving mechanism and an optical pickup approached to and separated from the disc cartridge, a stationary part support substrate rotatably supporting the rotation supporting substrate, a rotation driving mechanism for rotating the rotation supporting mechanism, and a driving part supporting substrate lift mechanism for bringing the disc rotation driving mechanism and the optical pickup towards the disc cartridge or separating them away from the disc cartridge. Plural discs may be sequentially reproduced without displacing the disc cartridge by rotationally driving the rotating supporting substrate and bringing the disc rotationally driving mechanism and the optical pickup towards the disc cartridge or separating them away from the disc cartridge.

27 Claims, 25 Drawing Sheets

5,677,898

DISC CARTRIDGE CONTAINER AND APPARATUS HAVING A PLURALITY OF CARTRIDGES ARRANGED FOR SIMULTANEOUS SHUTTER OPENING CLOSING

TECHNICAL FIELD

This invention relates to a disc cartridge container for containing and holding a matrix array of a plurality of disc cartridges each housing a disc on which information signals such as music signals are recorded or are to be recorded, and to a disc recording and/or reproducing apparatus for selecting one of the plural disc cartridges contained and held within the disc cartridge container and recording/reproducing the information signals on or from the disc contained in the selected disc cartridge, or sequentially recording/reproducing the information signals on or from the discs contained in the disc cartridges.

BACKGROUND ART

There has hitherto been employed a disc recording and/or reproducing apparatus having a disc exchange function of selecting one of disc cartridges previously stored in a disc container and of reproducing information signals, such as music signals, recorded on a disc contained in each disc cartridge, or recording information signals on the disc.

With such disc recording and/or reproducing apparatus, the disc cartridges are contained in the cartridge container so that the major surfaces of the disc contained in the disc cartridges face each other, that is, plural disc cartridges in the form of thin plates are stacked vertically.

By stacking the disc cartridges and containing them in this state in the cartridge container, plural disc cartridges may be efficiently contained in a smaller space.

However, for recording and/or replay of the information signals, it becomes necessary to provide a disc exchange mechanism for pulling out the disc cartridge from the cartridge container and transferring the disc cartridge to a disc recording and/or reproducing section for loading thereon. Besides, with a disc recording and/or reproducing apparatus, having such disc exchange function, it is necessary to provide a mechanism whereby the disc cartridge pulled out from the cartridge container may be loaded on a disc driving unit provided with a disc rotation driving mechanism and/or information signal recording and/or reproducing means. The result is the increased size and complicated mechanism of the disc recording and/or reproducing apparatus.

On the other hand, with the disc container having cartridge container sections for holding plural disc cartridges in a stacked state, it is not possible to check the indication of the recording contents of the disc contained in the disc cartridge on a label affixed on the surface of the disc cartridge.

Besides, with the cartridge container containing plural disc cartridges in a stacked state, since the cartridge inserting/detachment opening having a width corresponding to the thickness of the disc cartridge is arrayed so as to be sequentially stacked in one plane, it becomes extremely difficult to introduce or detach the disc cartridges. That is, it becomes extremely difficult to have the desired disc cartridges contained correctly in the pre-set cartridge container.

It is therefore an object of the present invention to provide a disc cartridge container in which plural disc cartridges may be arrayed so that the major surfaces of the discs contained in the cartridge main members are in one and the same plane so that the plural disc cartridges may be correctly contained without stacking vertically.

It is another object of the present invention to provide a disc cartridge container in which indication means for indicating the recorded contents or the like provided on the surface of the disc cartridge may be seen through from outside.

It is a further object of the present invention to provide a disc cartridge container in which a shutter member provided on the disc cartridge is adapted to be opened and closed after the disc cartridge is contained in a cartridge container for assuring positive protection of the disc contained in the disc cartridge.

It is a further object of the present invention to provide a disc cartridge container and a recording and/or reproducing apparatus employing such disc cartridge container, in which the shutter member provided on the disc cartridge contained in the disc cartridge container section is adapted to be opened and closed in association with the insertion and detachment into and out of the disc recording and/or reproducing apparatus for realizing positive protection of the disc contained in the disc cartridge and positive opening and closure of the shutter member.

It is a further object of the present invention to provide a recording and/or reproducing apparatus on which is loaded a disc cartridge container capable of containing plural disc cartridges in one plane without stacking and in which information signals may be sequentially recorded on or reproduced from the disc contained in the loaded disc cartridge container using one and the same recording/replay means.

It is a further object of the present invention to provide a recording and/or reproducing apparatus in which, by employing a disc cartridge container in which plural disc cartridges may be arranged in one plane without stacking, the mechanism of the disc recording and/or reproducing apparatus may be simplified and reduced in size and thickness.

It is a further object of the present invention to provide a recording and/or reproducing apparatus in which the type of the disc accommodated in the disc cartridge may be discriminated in the course of the movement of the driving part support substrate carrying the disc rotation driving mechanism and information signal recording and/or reproducing means towards the disc contained in the disc cartridge for enabling the setting of the operating modes for the recording and/or reproduction associated with the type of disc loaded on the disc rotationally driving mechanism.

It is a further object of the present invention to provide a recording and/or reproducing apparatus in which the disc rotation driving mechanism and information signal recording and/or reproducing means when shifted to the position of recording information signals on the disc or of reproducing the signals from the disc may be positively maintained in the shifted position to enable recording/replay of the information signals in a stabilized state.

It is a further object of the present invention to provide a recording and/or reproducing apparatus in which the operation of approaching the disc rotation driving mechanism and information signal recording and/or reproducing means towards the disc and separating them from the disc and the operation of holding the disc rotation and driving mechanism and the information signal readout means may be performed using a single cam for realizing a positive operation of a mechanism for shifting and positioning the disc rotation driving mechanism and information signal recording and/or reproducing means and simplifying the mechanism in its entirety.

It is a further object of the present invention to provide a recording and/or reproducing apparatus in which a flexible wiring board for electrical interconnection between an electronic circuit provided on the rotatable supporting substrate carrying the disc rotation driving mechanism and information signal recording and/or reproducing means and an electronic circuit provided on a stationary supporting substrate for rotatably carrying the rotatable supporting substrate may be protected and stabilized rotation of the rotation supporting substrate may be assured.

DISCLOSURE OF THE INVENTION

The present invention provides a cartridge container having plural cartridge container sections each containing a disc cartridge consisting of a disc and a cartridge main member containing the disc. The cartridge container sections are arranged so that the disc cartridges are arrayed with their planar sides facing the major surfaces of the discs lying in one and the same plane.

The cartridge container includes shutter opening/closing apparatus for opening and closing a shutter member mounted on each disc cartridge, which shutter member is adapted for opening and closing a recording/reproducing aperture provided in the cartridge main member, with the recording/reproducing aperture exposing at least a part of the disc contained in the cartridge main member, an opening for exposing at least a recording/reproducing aperture and an aperture and a disc inlet opening formed in the cartridge main member, and a cut-out for exposing a positioning pin engagement opening formed in the cartridge main member to the outside.

The cartridge container includes a window for enabling a portion of the disc cartridge contained in the cartridge container to be viewed from outside.

The disc cartridge container also includes a shutter opening actuating member mounted facing the front end face along which the shutter member of the disc cartridge contained in the cartridge container is moved, a shutter closing actuating member arranged in a side-by-side relation with respect to the shutter opening actuating member, a rotation actuating plate mounted in association with each cartridge container section for moving the shutter opening member and the shutter closing member arranged as a pair, and a rotation actuating gear meshing with a gear part formed on the outer periphery of the rotation actuating plate for rotating the rotation actuating plate.

The present invention also provides a disc recording and/or reproducing apparatus including a plurality of cartridge container sections each containing a disc cartridge consisting of a disc and a cartridge main member containing the disc. The cartridge container sections are arranged so that the disc cartridges are arrayed with their planar sides facing the major surfaces of the discs lying in one and the same plane. The apparatus also includes a shutter opening actuating member mounted facing the front end face along which the shutter member of the disc cartridge contained in the cartridge container is moved, a shutter closing actuating member arranged in a side-by-side relation with respect to the shutter opening actuating member, a rotation actuating plate mounted in association with each cartridge container section for moving the shutter opening member and the shutter closing member arranged as a pair, and a rotation actuating gear meshing with a gear part formed on the outer periphery of the rotation actuating plate for rotating the rotation actuating plate, and a disc cartridge container holder in which the disc cartridge container is inserted and held and which is provided with a rack gear meshing with the rotation actuating gear in association with insertion and detachment of the disc cartridge container. The shutter member provided on the disc cartridge is opened and closed in association with the insertion and detachment of the disc cartridge container into the disc cartridge container holder.

The present invention also provides a disc recording and/or reproducing apparatus including a cartridge container having plural cartridge container sections each containing a disc cartridge consisting of a disc and a cartridge main member containing the disc. The cartridge container sections are arranged so that the disc cartridges are arrayed with their planar sides facing the major surfaces of the discs lying in one and the same plane. The apparatus also includes a rotation supporting substrate supporting a driving part support substrate carrying at least a disc rotation driving mechanism and the information signal recording and/or reproducing unit adapted for being approached to and separated from the disc cartridge contained in each cartridge container section of the disc cartridge container, a stationary part supporting substrate rotatably supporting the rotation supporting substrate, rotation driving apparatus rotationally driving the rotation supporting substrate for moving the disc rotation driving mechanism and the information signal recording and/or reproducing unit loaded on the driving part supporting substrate to a position facing one of the disc cartridges contained in the cartridge container sections of the disc cartridge container, and a driving part supporting substrate lift mechanism for lifting the driving part supporting substrate for approaching the disc rotation driving mechanism and the information signal recording and/or reproducing unit carried by the driving part supporting substrate towards and away from the disc cartridge contained in the disc cartridge container. By rotationally driving the rotation supporting substrate carrying the disc rotation driving mechanism, the disc rotationally driving mechanism and the information signal recording and/or reproducing unit may be moved to the position of facing one of the disc cartridges contained in the disc cartridge container sections. Also, by lifting the driving part supporting substrate loaded on the driving part supporting substrate lift mechanism, the disc rotation driving mechanism and the information signal recording and/or reproducing means may be drawn close to or moved away from the disc contained in the disc cartridge.

Besides, the rotation supporting substrate has its rotation controlled when the driving part supporting substrate has been moved to the position facing the selected disc cartridge contained in the disc cartridge container section so that the driving part supporting substrate is controlled in its lifting movement at the position in which the disc rotation driving mechanism and the information signal recording and/or reproducing means are drawn closer to the disc contained in the selected disc cartridge and the position in which the disc rotation driving mechanism and the information signal recording and/or reproducing means are moved away from the disc.

BEST MODE FOR CARRYING OUT THE INVENTION

Figure 1:
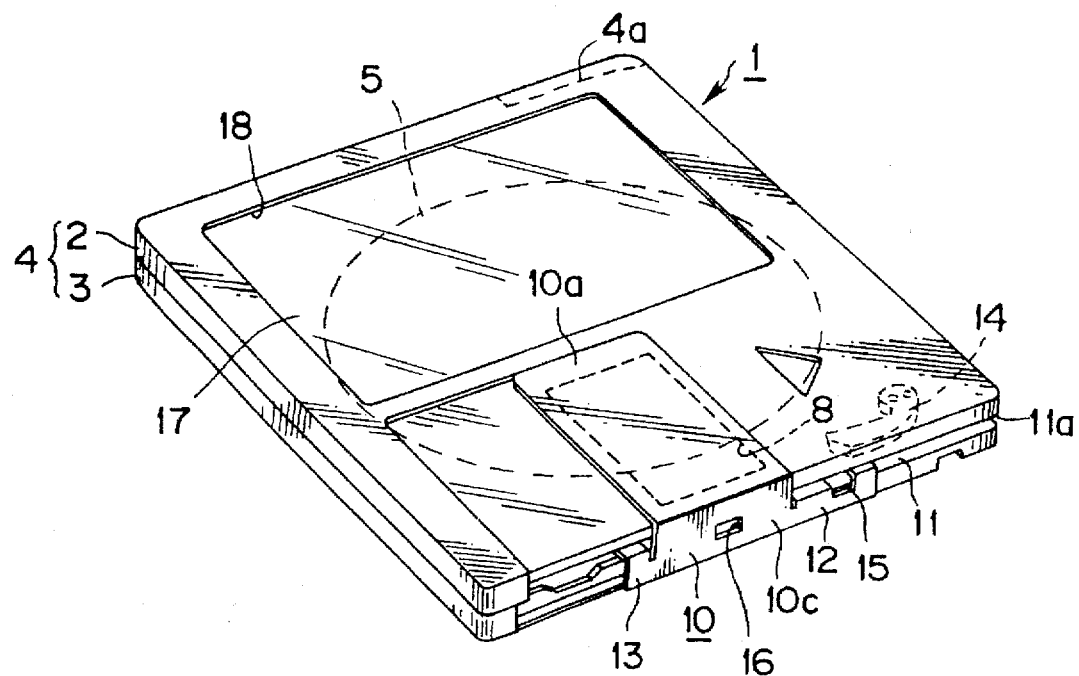
FIG. 1 is a perspective view, as seen from above, showing a disc cartridge to be loaded in a disc cartridge container according to the present invention.

Referring to the drawings, illustrative embodiments of the present invention will be explained in detail.

Before proceeding to description of the disc cartridge container according to the present invention, a disc cartridge contained in the disc cartridge container is explained.

Figure 2:
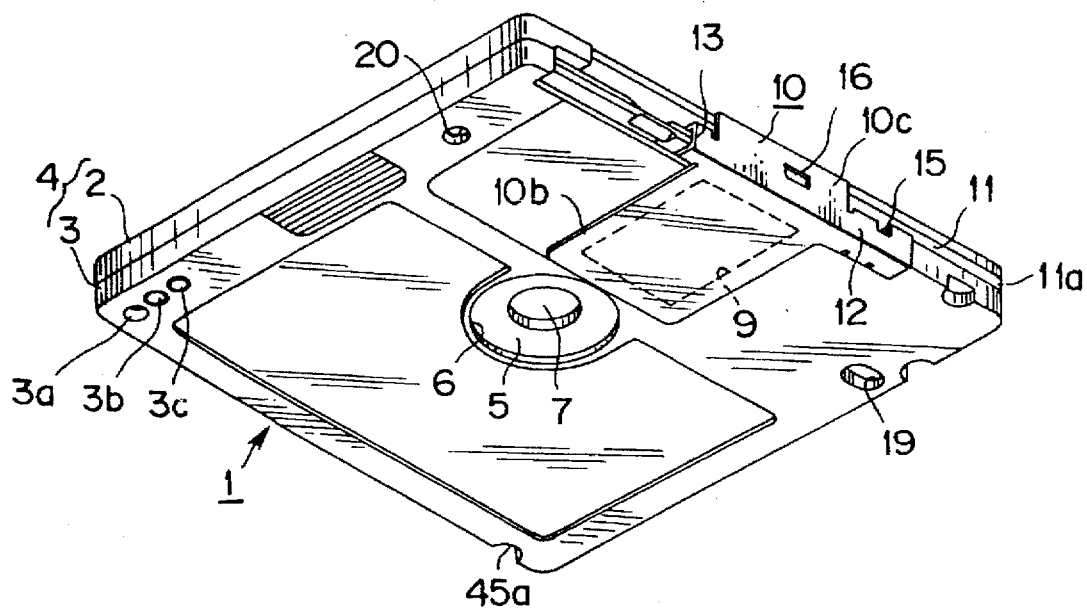
FIG. 2 is a perspective view, as seen from below, showing the disc cartridge shown in FIG. 1.

The disc cartridge 1 includes an upper half 2 and a lower half 3 abutted and bonded to each other to form a cartridge main member 4, and an optical disc 5, as a recording medium for recording information signals, which is housed within the cartridge main member 4, as shown in FIG. 1 and FIG. 2. The upper and lower halves 2 and 3 are rectangular in contour and prepared by molding from synthetic resin, as shown in FIG. 2.

The optical disc 5 is of a diameter approximately equal to 64 mm, and has a recording capacity of recording music signals continuing for 74 minutes. The cartridge main member 4, adapted for housing the optical disc 5, is of a size large enough to hold the optical disc 5.

The lower half 3 of the cartridge main member 4 housing the optical disc 5 is formed with an opening 6 into which a disc table of a disc rotation driving mechanism for causing the rotation of the optical disc 5 is intruded when the disc cartridge 1 is loaded on the disc recording and/or reproducing apparatus, as shown in FIG. 2. The opening 6 is formed so as to cause the exposure to outside of the inner rim portion of the optical disc 5, housed within the cartridge main member 4, inclusive of a metal plate 7 mounted for overlying a center aperture of the optical disc 5, as shown in FIG. 2. The metal plate 7 is formed of a magnetic material for clamping the optical disc 5 in position.

The upper and lower surfaces of the cartridge main member 4, that is the upper and lower halves 2, 3, are formed with information signal recording/reproducing apertures 8 and 9, respectively, for exposing at least a portion of the signal recording area of the optical disc 5 housed therein to outside. These information signal recording/reproducing apertures 8 and 9 are rectangular in shape and positioned at a mid position along the transverse edge of the cartridge main member 4 for extending from a position proximate to the opening 6 as far as the forward end face of the cartridge main member 4, as shown in FIG. 2.

A shutter member 10 for opening and closing the information signal recording/reproducing apertures 8 and 9 is fitted on the forward end face of the cartridge main member 4, as shown in FIGS. 1 and 2.

Meanwhile, the forward end face of the cartridge main member 4, along which the shutter member 10 is moved, is formed with a groove 11 into which a portion of the shutter member 10 is intruded and into which a shutter opening actuating member is also intruded for actuating the shutter member 10. As shown in FIGS. 1 and 2, the groove 11 has an opening end 11a on a lateral surface of the cartridge main member 4 normal to the forward end face thereof and is formed for extending in the direction of movement of the shutter member 10.

The shutter member 10, which is of a substantially rectangular profile, is punched from a thin metal sheet and bent, or it can be molded from a synthetic material. The shutter member has shutter sections 10a, 10b for opening or closing the information signal recording/reproducing apertures 8 and 9 and a connecting web portion 10c interconnecting the shutter sections 10a, 10b. First and second slide guide sections 12, 13 are formed as one with both ends of the connecting web portion 10c of the shutter member 10 for stably guiding the movement of the shutter member 10 along the front end face of the cartridge main member 4. The distal end of the slide guide section 12 is bent to form a lock lug 15 adapted for being intruded into the groove 11 in the forward end face of the cartridge main member 4 for being engaged with a shutter locking member 14 provided within the cartridge main member 4. When the shutter member 10 is in a position of closing the information signal recording/reproducing apertures 8 and 9, the lock lug 15 is engaged with the shutter locking member 14 for maintaining the closed state of the information signal recording/reproducing apertures 8 and 9.

When the shutter opening actuating member is intruded into the groove 11 formed in the forward end face of the cartridge main member 4, the shutter locking member 14, adapted for holding the shutter member 10 in the aperture closing position, is elastically deformed by the shutter opening actuating member. As a result thereof, the lock lug 15 is disengaged from the shutter locking member 14 to permit the shutter member 10 to be moved by the shutter opening actuating member in a direction of opening the information signal recording/reproducing apertures 8 and 9. When the disc cartridge 1 is loaded on a pre-set cartridge loading unit, such as a disc cartridge container, the shutter member 10 is moved to a position of completely opening the information signal recording/reproducing apertures 8 and 9. At this time, the shutter closing actuating member provided on the cartridge loading section is engaged with an opening 16 formed at a mid portion of the connection web portion 10c of the shutter member 10 for maintaining the shutter member 10 at a position of opening the information signal recording/reproducing apertures 8 and 9.

Meanwhile, the shutter closing actuating member puts a load on the shutter member 10 when ejecting the disc cartridge 1 from the cartridge loading section. When the disc cartridge 1 is ejected from the cartridge loading section, the shutter closing actuating member halts the shutter member 10 at the aperture opening position during the movement of the cartridge main member 4 in the ejecting direction. As a result thereof, the shutter member 10 is moved relative to the cartridge main member 4 to a position of closing the information signal recording/reproducing apertures 8 and 9. When the shutter member 10 is moved to the position of closing information signal recording/reproducing apertures 8 and 9, the lock lug 15 is engaged with the shutter locking member 14 for maintaining the closed position of the information signal recording/reproducing apertures 8 and 9.

The upper half 2 of the cartridge main member 4 of the disc cartridge 1 has a label sticking area 18 in which to stick a label 17 for indicating the contents of the information which is recorded or to be recorded on the optical disc 5 contained in the cartridge main member 4. The label sticking area 18 is formed in a portion of the cartridge main member 4 which is not covered by the shutter section 10a of the shutter member 10, that is a portion between the mid part and the rear edge of the cartridge main member 4, as shown in FIG. 1.

The lower half 3 constituting the lower surface of the cartridge main member 4 has engaging openings 19, 20 engaged by positioning pins, not shown, formed on the cartridge loading section. The engaging openings 19, 20 are formed on both sides of a sliding area of the shutter member 10, with the engaging opening 19 being an elongated opening having its long axis extending along the sliding direction of the shutter member 10, as shown in FIG. 2.

The rear end face of the cartridge main member 4 opposite to its forward end carrying the shutter member 10 has a mistaken insertion inhibition groove 4a having an opening end on the lateral surface of the cartridge main member 4 by which the cartridge main member is to be loaded on the cartridge loading section.

Figure 3:
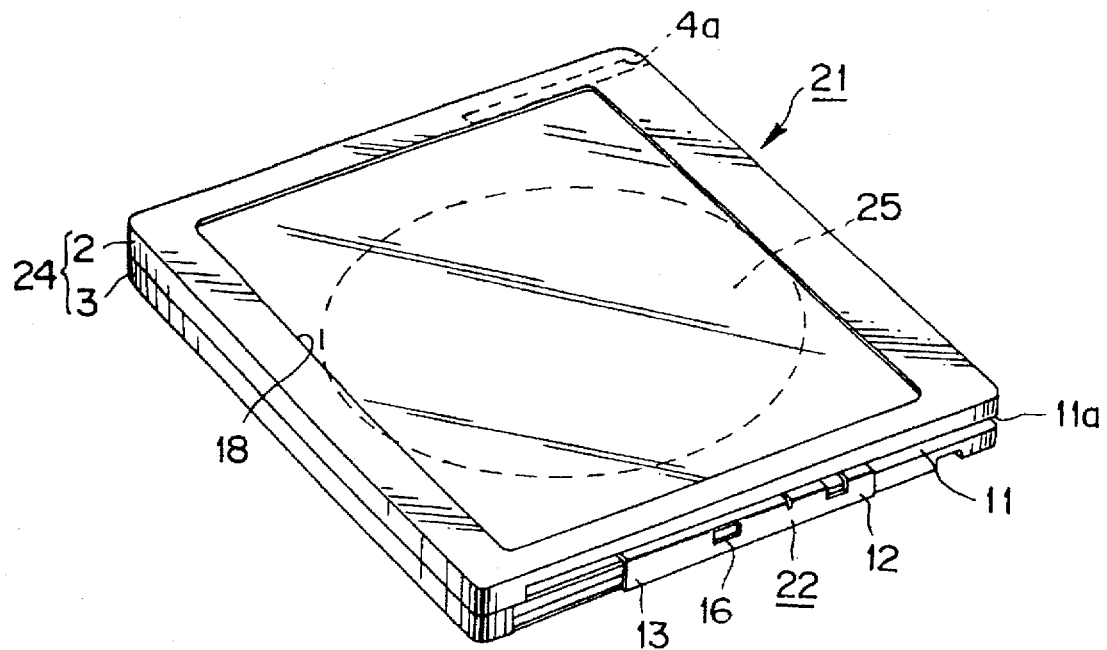
FIG. 3 is a perspective vie, as seen from above, showing a modification of the disc cartridge to be loaded in a disc cartridge container according to the present invention.

The disc cartridge 1 contains a recordable type optical disc 5 on which information signals may be recorded by forcing an external magnetic field from an external magnetic field head under radiation of a light beam exiting from an optical head. A disc cartridge 21 containing a read-only optical disc 25 having information signals, such as music sound signals, pre-recorded thereon, may also be loaded on the disc cartridge container according to the present invention as shown in FIG. 3. The disc cartridge 21 is identical in shape to the above-mentioned disc cartridge 1 and the optical disc 25 contained in the cartridge main member 24 is also identical in size to the recordable type optical disc 5.

Figure 4:
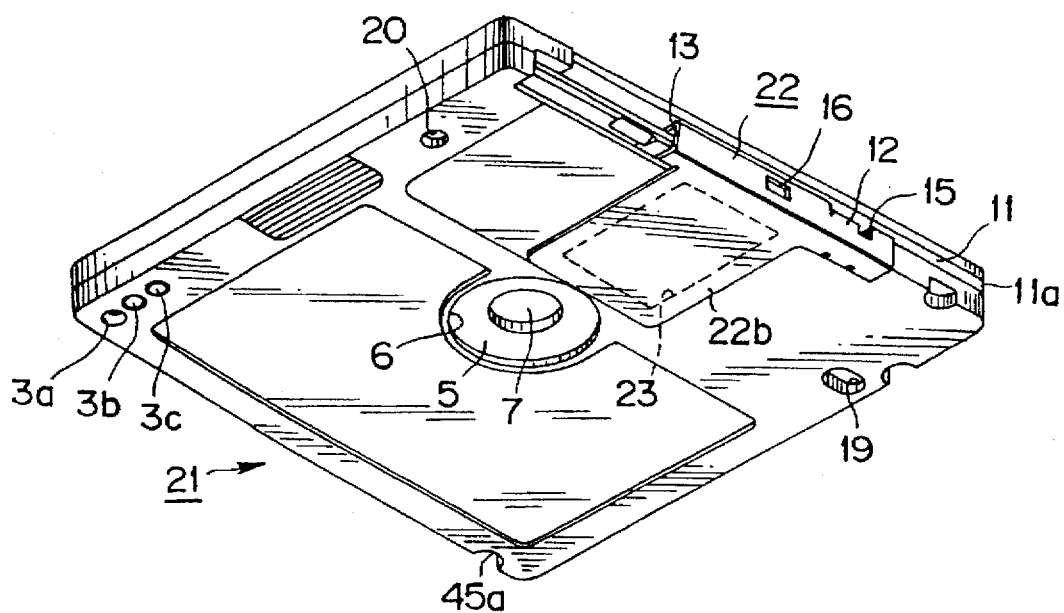
FIG. 4 is a perspective view, as seen from below, showing the disc cartridge shown in FIG. 3.

However, the disc cartridge 21 containing the read-only optical disc 25 is employed exclusively for reproducing information signals, so that there is no necessity of providing an aperture in the disc cartridge for allowing the external magnetic field head applying an external magnetic field to the optical disc 25 for facing the inside of the cartridge main member 24, because it is unnecessary to apply the external magnetic field to the disc for recording information signals. Consequently, the disc cartridge 21 is not provided with an aperture faced by the external magnetic field head provided on the upper half 2 constituting the upper surface of the disc cartridge 1 containing the recordable type optical disc 5, as shown in FIG. 3. That is, the upper half 2 constituting the upper surface of the disc cartridge 21 presents a solid surface free of apertures, as shown in FIG. 3. Besides, the shutter member 22 is not provided with a shutter section covering the upper half 2, but is provided only with the shutter section 22b for covering an information signal reproducing aperture 23 formed in the lower half 3 of the cartridge main member 4, as shown in FIG. 4.

It is noted that the shutter member 22 is similar in construction to the shutter member associated with the disc cartridge 1 containing the recordable type optical disc 5, except that it is provided with the shutter section 22b on its one side only. Since the information signal reproducing aperture 23 is opened and closed by the similar operation to that described above, the detailed description is not made herein.

Since the upper half 2 of the disc cartridge 21 containing the read-only optical disc 25 is not formed with the aperture, substantially the entire surface of the upper half 2 is used as a label sticking area 18. The construction of the cartridge main body 24 is otherwise the same as that of the cartridge main member 4 for the disc cartridge 1, so that detailed description is not made herein.

A disc cartridge container 30 according to the present invention is adapted for containing a plurality of, herein four, disc cartridges 1 and/or 21. The disc cartridge 1 contains the re-recordable optical disc 5 capable of re-recording information signals as mentioned above, while the disc cartridge 21 contains the optical disc 25 capable of only reproducing the information signals.

Figure 5:
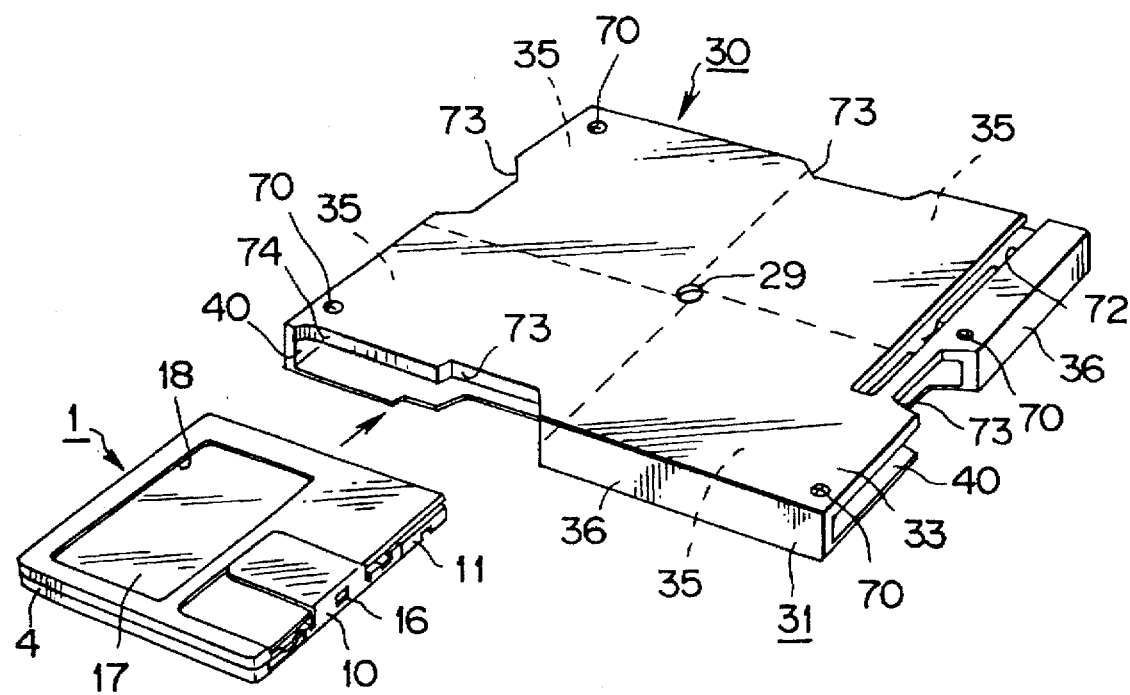
FIG. 5 is a perspective view showing a disc cartridge container according to the present invention.
Figure 6:
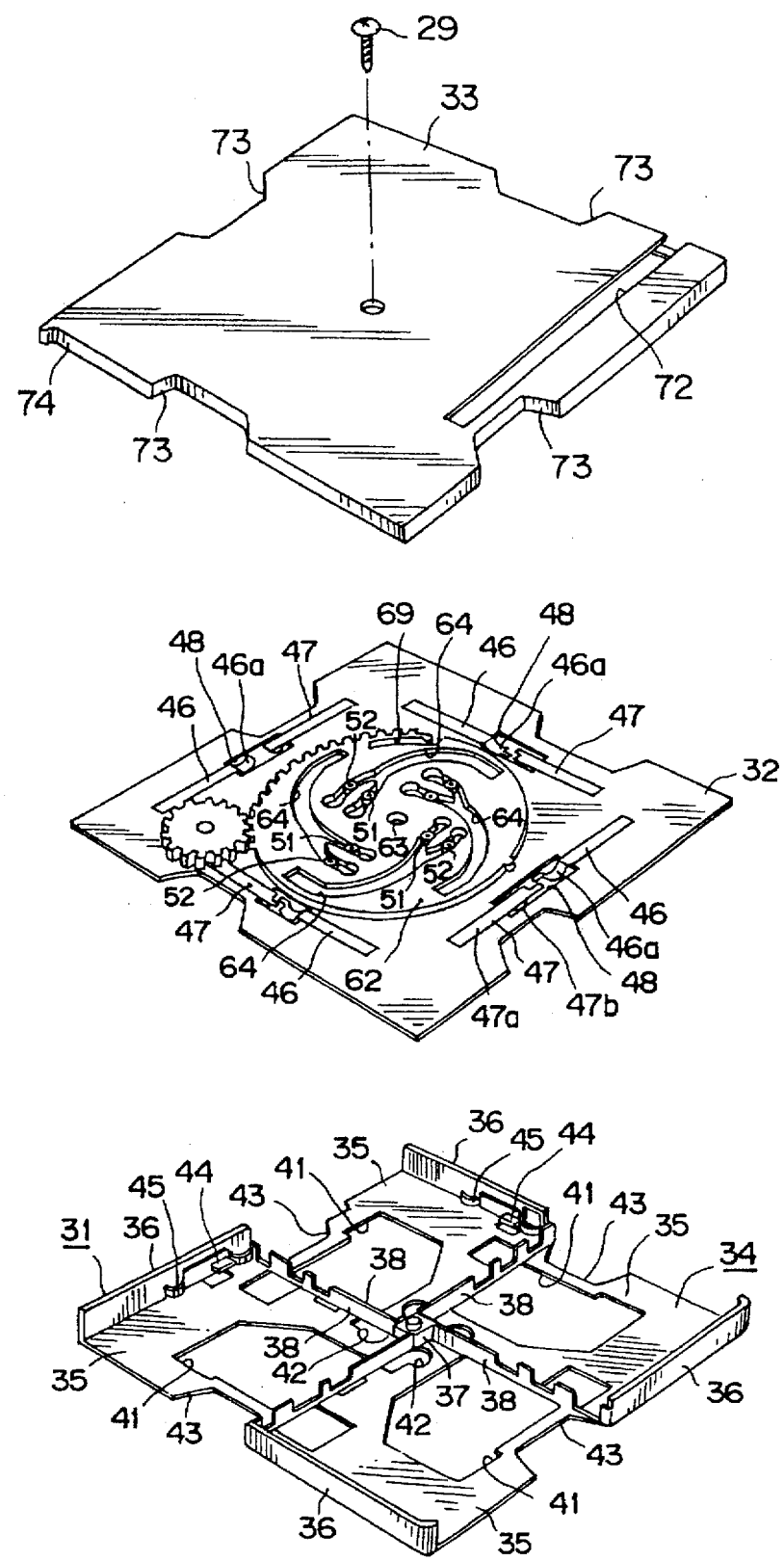
FIG. 6 is an exploded perspective view showing the disc cartridge container.
Figure 7:
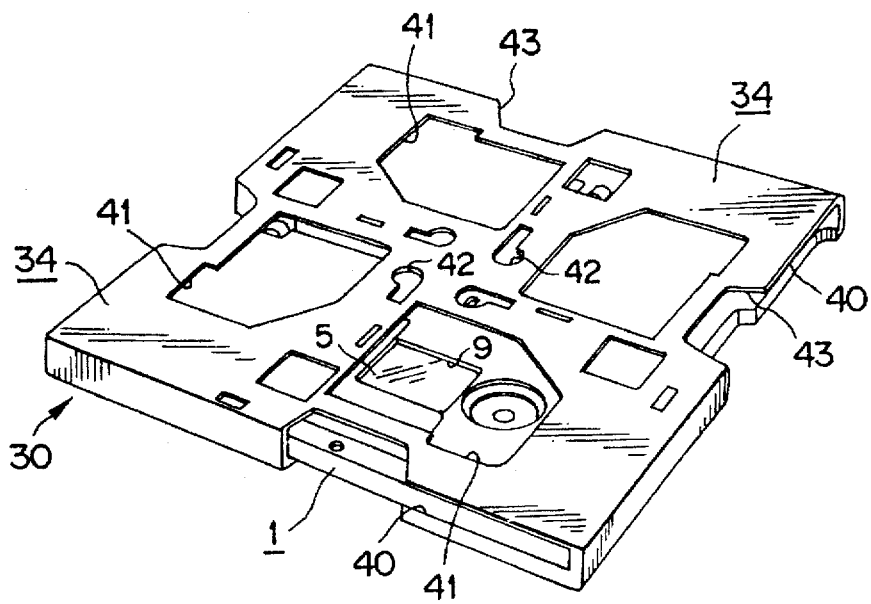
FIG. 7 is a perspective view showing the bottom surface of the disc cartridge container.

The disc cartridge container 30 is made up of a flat rectangular box-shaped container main member 31, a mid partitioning plate 32 mounted for covering the open side of the container main member 31 and a lid 33 mounted for covering the mid partitioning plate 32 for closing the opening side of the container main member 31, as shown in FIGS. 5, 6 and 7.

The container main member 31 is dimensioned to hold therein a matrix array of four of the disc cartridges 1 and/or 21 so that the planar surface sides thereof opposite to the major surfaces of the optical discs 5, 25 contained in the cartridge main members 4, 24 will face a bottom wall 34 of the main member 31. That is, the container main member 31 is sized to hold a 2×2 matrix array of the disc cartridges 1 or 21. The outer peripheral sides of the container main member 31 are formed by upstanding peripheral wall members 36 constituting plural cartridge containers 35 containing plural disc cartridges 1 and/or 21, as shown in FIG. 6. At a mid portion of the bottom wall 34 of the container main member 31 is formed an upstanding boss 37 for threaded engagement with the mid partitioning plate 32 and the lid 33 which are provided on the opening side of the container main member 31. A plurality of partitioning wall members 38 are set upright towards the respective sides of the container main member 31 from the boss 37 as the center. These partitioning wall members 38 are set upright so as to be normal to the sides of the container main member 31. These partitioning wall members 38 and the upstanding peripheral wall members 36 delimit separate areas in which to hold the disc cartridges 1 and/or 21. By the mid partitioning plate 32 mounted for closing the opening side of the container main member 31, the cartridge containers 35 are formed by the spacings delimited by the partitioning wall members 38, upstanding peripheral wall members 36 and the mid partitioning plate 32.

The upstanding peripheral wall sections 36, formed on the outer peripheral sides of the container main member 31, are formed only on one half of the sides of the container main member 31. Thus the portions of the sides of the container main member 31 free from the upstanding peripheral wall members 36 are left open. The portions of the cartridge main member 31 not having the peripheral wall members 36 represent cartridge inserting/detachment opening areas delimited by the bottom wall 34 and the mid partitioning plate 32. The portions of the cartridge main member 31 not having the peripheral wall members 36 are designed not to be adjacent to each other, and are provided on the lefthand sides on the outer periphery of the container main member 31, as shown in FIG. 6. The opening edge of the bottom wall 34 constituting a cartridge inserting opening area 40 is formed with an inclined surface for facilitating the insertion and removal of the disc cartridge 1 or 21 introduced into the cartridge container 35.

The bottom wall 34 for each cartridge container 35 of the container main member 31 is formed with an aperture 41 for exposing the information signal recording/reproducing aperture 9 or the information signal reproducing aperture 23 and the disc table inlet opening 6 formed in the lower half 3 of the disc cartridge 1 or 21 contained in the cartridge container 35 to outside, as shown in FIGS. 6 and 7. Besides, the bottom wall 34 is formed with a cut-out opening 42 and a notch 43 for exposing positioning pin engaging openings 19 and 20 formed in the lower half 3 of the disc cartridge 1 or 21 the outside.

Meanwhile, the notch 43 also functions as a finger rest as an aid for inserting or removing the disc cartridge 1 or 21 contained within the cartridge container 35.

The inner peripheral surface of the upstanding peripheral wall members 36 of the cartridge container 35 facing the partitioning plate 38 making up the cartridge container 35 is formed with a mistaken insertion inhibiting lug 44 adapted for being engaged with a mistaken insertion inhibition groove 4a formed in the rear end face of the cartridge main member 4, as shown in FIG. 6. The mistaken insertion inhibiting lug 44 plays the role of preventing the disc cartridge 1 or 21 being inserted into the container section 35 in an incorrect inserting direction. On each of the inner peripheral surface of the upstanding peripheral wall members 36, there is mounted a detachment inhibitive member 45 in the form of a spring member, such as a plate spring member, adapted for being engaged with an engagement recess 45a formed in the rear end face of the disc cartridge 1 or 21 introduced into the cartridge container 35 for preventing the disc cartridge from being detached from the container 35.

The mid partitioning plate member 32, mounted on the container main member 31 for closing the opening side of the container main member 31, is formed by punching a thin metal plate in a substantially rectangular shape, and mounts cartridge thrusting and supporting members 46, 47 adapted for thrusting and supporting the upper sides of the disc cartridges 1 or 21 contained within the cartridge containers 35. A pair of the cartridge thrusting and supporting members 46, 47 is associated with each cartridge container 35, with the cartridge thrusting and supporting member 46 being positioned for thrusting the inner sides of the disc cartridges 1 or 21 contained in the cartridge containers 35 and with the cartridge thrusting and supporting member 47 being positioned for thrusting the sides of the disc cartridges 1 or 21 in register with the cartridge inserting/detachment opening area 40. The cartridge thrusting and supporting member 46 is formed by bending a plate spring member and has a terminal curved thrusting portion 46a intruded into the cartridge container 35 via a cut-out opening 48 formed in the mid partitioning plate member 32 for thrusting and supporting the upper surface of the disc cartridge 1 or 21 housed within the cartridge container 35. The opposite cartridge thrusting and supporting member 47 is formed by an elastic deflective member 47a, in the form of a plate spring member, having an end boss 47b of synthetic resin which is intruded into the cartridge container 35 via the cut-out opening 48 for thrusting and supporting the upper side of the disc cartridge 1 or 21 contained in each cartridge container 35.

Figure 8:
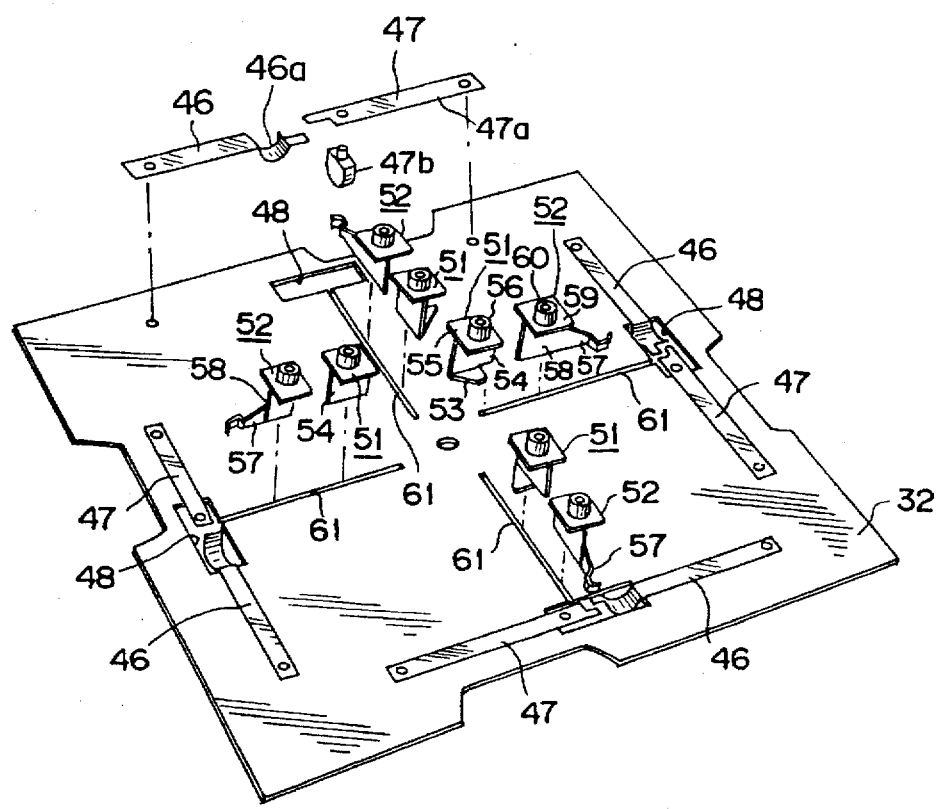
FIG. 8 is a perspective view showing a mid partitioning plate of the disc cartridge container.

The mid partitioning plate 32 is provided with a movable shutter opening actuating member 51 and a shutter closure actuating member 52 facing the front end face of the disc cartridge 1 or 21 within the cartridge container 35 along which is moved the shutter member 10 or 22, as shown in FIG. 8.

Meanwhile, the disc cartridge 1 or 21 is inserted into and detached from the cartridge container 35 via the cartridge inserting/detachment opening area 40 with a lateral side of the disc cartridge extending normal to the slide direction of the shutter member 10 or 22 as an inserting side, as shown in FIG. 5. Thus, each partitioning wall 38 constituting each cartridge container 35 represents the surface facing the end face of the disc cartridge 1 or 21 along which the shutter member 10 or 22 is moved. The shutter opening actuating member 51 and the shutter closure actuating member 52, provided as a pair for each cartridge container 35, are adapted for being moved along each partitioning wall member 38.

The shutter opening actuating member 51 is made up of a slide guide member 54, a detachment preventative member 55 mounted on the upper edge of the slide guide member 54 and a roll 56 mounted on the upper end face of the detachment preventative member 55, as shown in FIG. 8. The slide guide member 54 is formed with a shutter opening actuating end lug 53 adapted for being intruded into the groove 11 formed in the front end face of the cartridge main member 4 of the disc cartridge 1 or 21 housed within the cartridge container.

On the other hand, the shutter closure actuating member 52 is made up of a slide guide member 58, a detachment preventative member 59 mounted on the upper edge of the slide guide member 58 and a roll 60 mounted on the upper end face of the detachment preventative member 58, as shown in FIG. 8. The slide guide member 58 is formed with a shutter closure actuating portion 57, in the form of a spring member, such as a plate spring member, adapted for riding on the front end face of the cartridge main member of the disc cartridge 1 or 21 housed within the cartridge container 35 so as to be moved along the connecting web portion 10c of the shutter member 10 or 22 for being thrust against and engaged in the mating opening 16 formed connecting web portion 10c.

The shutter opening actuating member 51 is slidably mounted on the mid partitioning plate 32, with the shutter opening actuating member 53 being protruded into the cartridge container 35 and with the slide guide member 54 being passed through a slide guide groove 61 formed in the mid partitioning plate 32 along each partitioning wall member 38 to cause the detachment preventative member 55 to be engaged with the upper surface of the mid partitioning plate 32. On the other hand, the shutter closure actuating member 52 is slidably mounted on the mid partitioning plate 32, with the shutter closure actuating member 57 being protruded into the cartridge container 35 and with the slide guide member 58 being passed through the slide guide groove 61 to cause the detachment preventative member 59 to be engaged with the upper surface of the mid partitioning plate 32. Thus the shutter closure member 52 is slidably mounted on the mid partitioning plate 32 parallel to the shutter opening actuating member 51.

On top of the upper surface of the mid partitioning plate 32, from which are protruded the rolls 56, 60 of the shutter opening actuating member 51 and the shutter closure actuating member 52, there is mounted a rotation actuating plate 62 for sliding the shutter opening actuating member 51 and the shutter closure actuating member 52 along the slide guide groove 61. The rotation actuating member 62 is mounted by passing the boss 37 set on a mid part of the container main member 31 through a center opening 63 thereof so that the rotation actuating member 62 may be rotated about the boss 37 as the center of rotation. The rotation actuating member 62 is formed with four cam grooves 64 in association with the shutter opening actuating member 51 and the shutter closure actuating member 52 provided as pairs in the cartridge containers 35. These cam grooves 64 are engaged by the rolls 56, 60 of the shutter opening actuating member 51 and the shutter closure actuating member 52 provided as pairs in the cartridge containers 35. The rotation of the rotation actuating member 63 as later explained causes the rolls 56, 60 to be moved along the cam groove 64 to cause the shutter opening actuating member 51 and the shutter closure actuating member 52 to be moved along the slide guide groove 61 as indicated by arrows A or B in FIG. 9.

Meanwhile, the cam groove 64 is bifurcated into branched cam grooves 64a, 64b by a bifurcation 65 set at its proximal side. In an initial state in which the disc cartridge 1 or 21 is not loaded in each cartridge container 35, the rolls 56 and 60 are located within the branched cam grooves 64a, 64b. At this time, the shutter opening actuating member 51 is positioned with the shutter opening actuating member 53 intruded into the opening area 11a of the groove 11 formed in the disc cartridge 1 or 21 housed within the cartridge container 35. That is, the shutter opening actuating member 51 is positioned so as not to actuate the shutter member 10 or 22 mounted on the disc cartridge 1 or 21. On the other hand, the shutter closure actuating member 52 is positioned so that the shutter closure actuating member 57 is abutted against and engaged in the mating opening 16 formed in the connecting web portion 10c of the shutter member 10 or 22 mounted on the disc cartridge 1 or 21 housed within the cartridge container 35.

Figure 9:
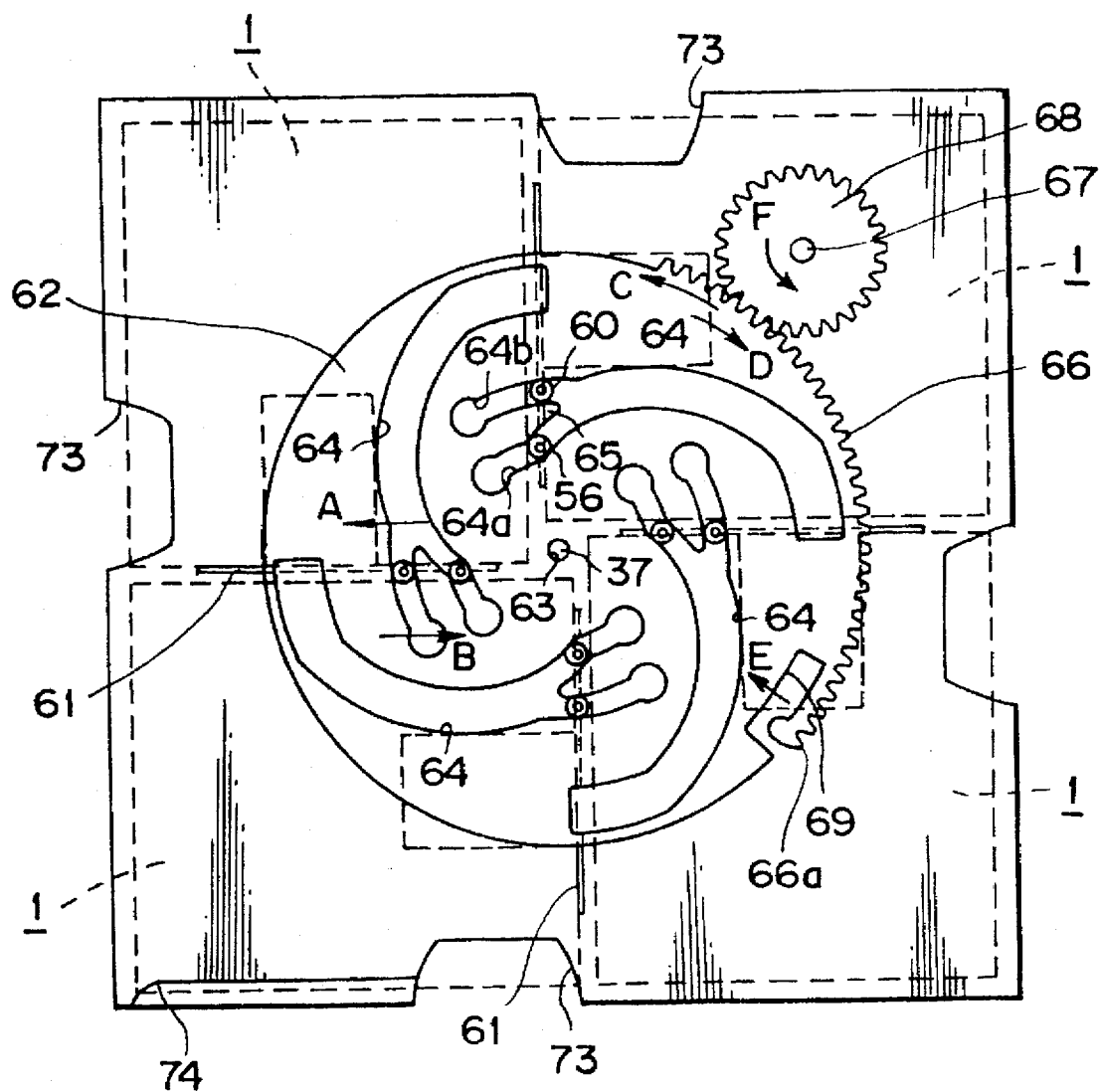
FIG. 9 is a plan view showing the state of movement of a shutter opening actuating member and a shutter closure actuating member.

When the rotation actuating member 62 is rotated in a direction indicated by an arrow C in FIG. 9, the rolls 56, 60 are intruded from the branched cam grooves 64a, 64b into the cam groove 64. As a result of the rotation actuating plate 62 being guided and moved along the cam groove 64, the shutter opening actuating member 51 and the shutter closure actuating member 52 are moved in a direction indicated by an arrow A in FIG. 9, with the slide guide members 54 and 58 being guided along the slide guide groove 61. The shutter opening actuating lug 53 of the shutter opening actuating member is intruded into the groove 11 formed in the cartridge main member 4 of the disc cartridge 1 or 21 housed within the disc container 35 for unlocking the shutter member 10 or 22 for moving the shutter member 10 or 22 in the direction of opening the information signal recording/reproducing apertures 8 and 9 or the information signal recording/reproducing aperture 23. At this time, the shutter closure actuating member 52 is moved in unison with the shutter member 10 or 22, with the shutter closure actuating lug 57 remaining pressed against and engaged in the mating opening 16 formed in the connecting web portion 10c of the shutter member 10 or 22.

When the rotation actuating plate 62 is rotated in a direction indicated by an arrow D in FIG. 9, and the rolls 56, 60 are moved by being guided along the cam groove 64, the shutter opening actuating member 51 and the shutter closure actuating member 52 are moved in a direction shown by an arrow B in FIG. 9 by the slide guide members 54 and 58 guided along the slide guide groove 61. As the shutter closure actuating member 52, having the shutter closure actuating member 57 pressed against and engaged in the mating opening 16, is moved in the direction shown by the arrow B in FIG. 9, the shutter member 10 or 22 is moved in the direction of closing the information signal recording/reproducing apertures 8 and 9 or the information signal recording/reproducing aperture 23.

The rotation of the rotation actuating member 62 in the directions shown by arrows C and D in FIG. 9 is produced by a rotation actuating gear 68 rotatably mounted on a supporting shaft 67 set on the mid partitioning plate 32 for meshing with a gear 66 formed on the outer periphery of the rotation actuating plate 62. The rotation actuating gear 68 is rotated by meshing with a rack gear provided on the disc recording and/or reproducing apparatus on which the disc cartridge container 30 is loaded in a manner as described subsequently.

Meanwhile, a notch 69 is formed at the foremost part of the gear 66 formed in the rotation actuating plate 62. By provision of the notch 69, an end part 66a of the gear 66 may be deflected resiliently in a direction shown by an arrow E in FIG. 9. The notch 69 plays the part of absorbing an excess rotating power applied to the gear 66 when the rotation actuating gear 68 causes the rotation actuating plate 62 to be rotated until the shutter member 10 or 22 is moved by the shutter opening actuating member 51 and the shutter closure actuating member 52 up to the aperture opening position and subsequently a force for causing further rotation of the rotation actuating plate 62 is exerted to the gear 66 by the rotation actuating gear 68.

The upper surface of the mid partitioning plate 32 mounting the rotation actuating plate 62 and the rotation actuating gear 68 is covered by the lid 33 mounted for closing the aperture in the container main member 31, as shown in FIGS. 5 and 6. The lid 33 is fixed to the container main member 31 by plural set screws 70. The lid 33 has its mid region secured by a set screw 29 to the boss 37 set upright at a mid portion of the container main member 31 to prevent the rotation actuating member 62 becoming detached from the boss 37. Besides, the rotation actuating gear 68 has the foremost part of its supporting shaft 67 supported by the inner surface of the lid 33 for being prevented from becoming detached from the supporting shaft 67.

The lid 33 is formed with an engagement groove 72 which is engaged by a rack plate, not shown, as the disc cartridge container 30 is loaded on the disc recording and/or reproducing apparatus. The rack plate is provided on the disc recording and/or reproducing apparatus and is formed with a rack gear engaged with the rotation actuating gear 68. The engagement groove 72 is formed in the lid for extending along a lateral side of the rotation actuating gear 68 from a disc cartridge container insertion end into the disc recording and/or reproducing apparatus. That is, since the engagement groove 72 is formed at a position offset from the center of the disc cartridge container 30, it acts as a groove for checking for mistaken insertion of the disc cartridge container into the disc recording and/or reproducing apparatus, as shown in FIG. 5.

The portion of the lid 33 making up the cartridge inserting/detachment opening area 40 in conjunction with the bottom wall 34 of the container main member 31 of the lid 33 has a finger rest notch 73 in register with the notch 43 formed in the bottom wall 34. That is, the notch 43 formed in the container main member 31 and the notch 73 formed in the lid 33 make up a cartridge holder disposed at the opening end of the cartridge inserting opening area 40 for holding the disc cartridge 1 or 21 housed within the cartridge container 35.

The opening end part of the lid 33 defining the cartridge inserting opening area 40 facing the disc cartridge container inserting/detachment opening of the disc recording and/or reproducing apparatus when the disc cartridge container 30 is loaded on the disc recording and/or reproducing apparatus is formed with a recess 74 receded towards the cartridge inserting side along the entire width of the opening end, as shown in FIG. 5. The recess 74 plays the part of allowing the rear inserting end of the disc cartridge 1 or 21 housed within the cartridge container 35 to be protruded from the cartridge inserting/detachment opening area 40 to permit facilitated gripping of the portion of the disc cartridge 1 or 21 protruded from the cartridge inserting/detachment opening area 40 when the disc cartridge container 30 is loaded in position on the disc recording and/or reproducing apparatus.

The disc cartridge 1 or 21 is inserted into each cartridge container 35 of the above-described disc cartridge container 30, with the lateral side of the disc cartridge normal to the front end face thereof carrying the movable shutter member 10 or 22 as the inserting side. When the disc cartridge 1 or 21 has been introduced into the disc container 35, the shutter opening actuating member 51 and the shutter closure actuating member 52 are at the initial position in a non-activated state. Consequently, when the disc cartridge 1 or 21 is inserted into the cartridge container 35, the shutter member 10 or 21 is locked by the shutter locking member 14, with the information signal recording/reproducing apertures 8 and 9 or the information signal recording/reproducing aperture 23 remaining in the closed position. Consequently, if the disc cartridge container 30 is transported or laid in store with the disc cartridge 1 or 21 remaining inserted into the cartridge container 35, it becomes possible to prevent dust and dirt being intruded via the information signal recording/reproducing apertures 8 and 9 or the information signal recording/reproducing aperture 23 into the inside of the cartridge main member 4 or 24 for assuring positive protection of the optical disc 5 or 25.

Meanwhile, when the disc cartridge 1 or 21 is inserted to a pre-set housing position in the cartridge container 35, the detachment preventative member 45 provided on the cartridge container 35 is engaged with the engagement recess 45a of the cartridge main member 4 or 24 to prevent the disc cartridge from being detached from the cartridge inserting/detachment opening area 40.

If, after housing the disc cartridge 1 or 21 into each of the cartridge containers 35, the rotation actuating gear 68 is rotated in a direction shown by an arrow F in FIG. 9 for causing rotation of the rotation actuating gear 68 in the direction shown by the arrow C in FIG. 9, the shutter opening actuating member 51 and the shutter closure actuating member 52 are moved in the direction shown by the arrow A in FIG. 9. As the shutter opening actuating member 51 is moved in the direction shown by the arrow A in FIG. 9, the shutter member 10 or 22 is unlocked to cause the shutter member 10 or 21 to be moved by the shutter opening actuating member 51 for opening the information signal recording/reproducing apertures 8 and 9 or the information signal recording/reproducing aperture 23. If the rotation actuating gear 68 is rotated in the direction opposite to that shown by the arrow F in FIG. 9, from the state in which the information signal recording/reproducing apertures 8 and 9 or the information signal recording/reproducing aperture 23 is opened, the rotation actuating plate 62 is rotated in the direction shown by the arrow D in FIG. 9 for shifting the shutter opening actuating member 51 and the shutter closure actuating member 52 in the direction shown by the arrow B in FIG. 9. The shutter member 10 or 22, having its opening 16 pressed and engaged by the shutter closure actuating member 57, is moved as one with the shutter closure actuating member 52 in the direction shown by the arrow B in FIG. 9 for closing the information signal recording/reproducing apertures 8 and 9 or the information signal recording/reproducing aperture 23.

The inside of the cartridge container section 35 cannot be seen through because the mid partitioning plate 32 is formed by a metal plate and the lid 33 is formed of opaque synthetic resin. However, the inside of the cartridge container section 35 can be seen through by forming the mid partitioning plate 32 and the lid 33 of the light-transmitting transparent resin material. Since the inside of the disc container section 35 can be seen through in this manner, the label 17 stuck on the disc cartridge 1 or 21 housed within the disc container section 35 can be visually checked from outside.

Figure 10:
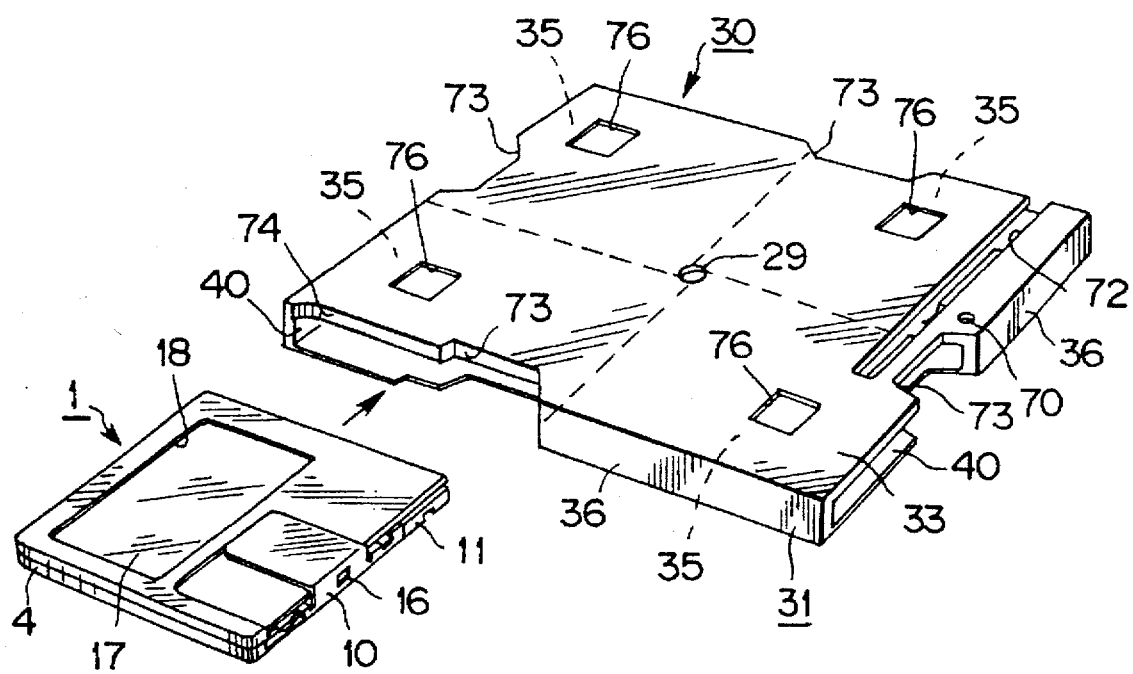
FIG. 10 is a perspective view showing a modification of a disc cartridge container according to the present invention.
Figure 11:
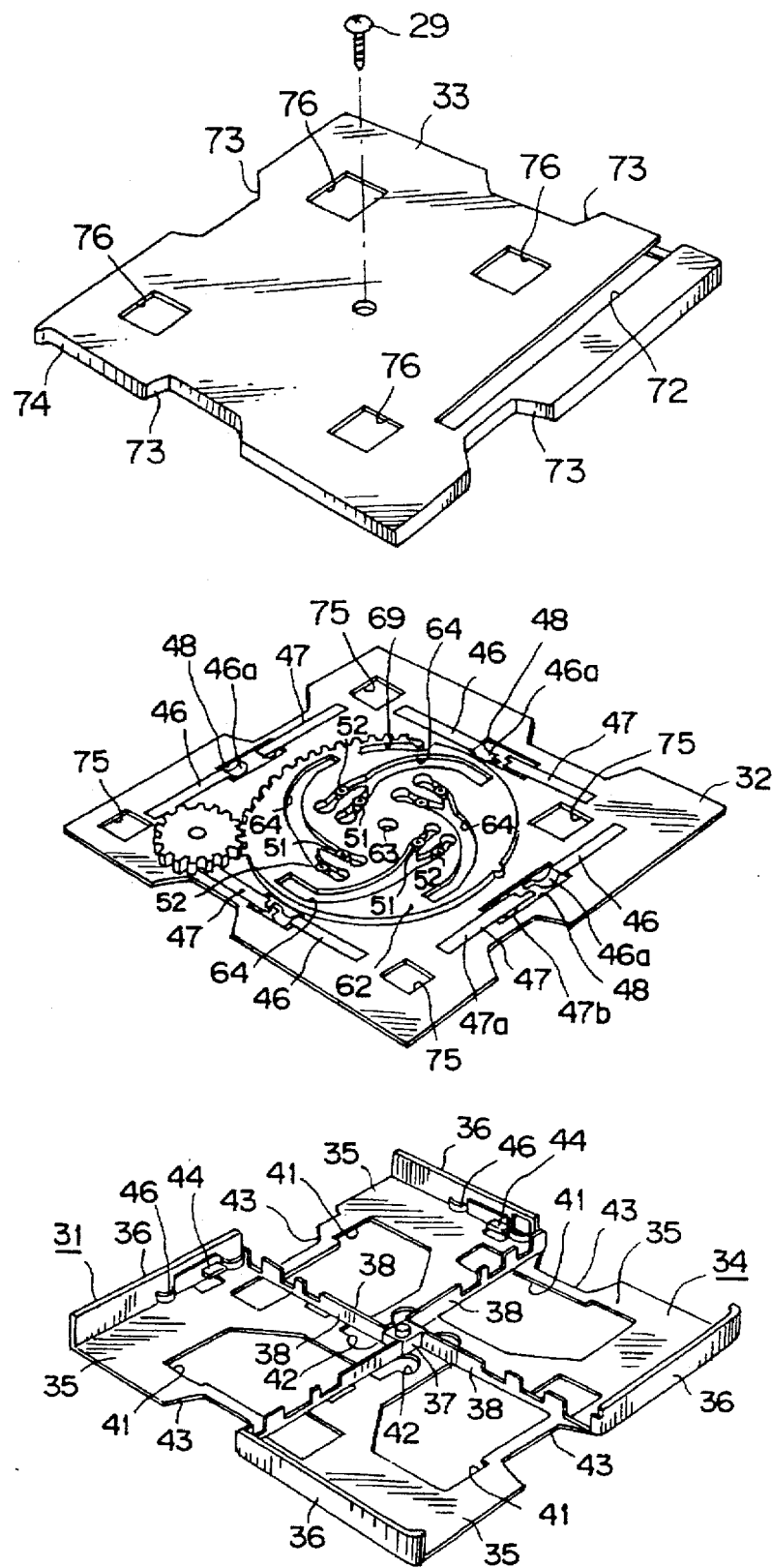
FIG. 11 is an exploded perspective view showing the disc cartridge container shown in FIG. 1.

In order for the inside of the disc container 35 to be seen through, the mid partitioning plate 32 formed of metal or the like opaque material and the lid 33 formed of the opaque synthetic resin may be formed with transparent windows 75 nd 76, as shown in FIGS. 10 and 11, so that the label 17 stuck on the disc cartridge 1 or 21 housed within the disc container 35 can be visually checked from outside.

Meanwhile, the transparent windows 75, 76 provided in the mid partitioning plate 32 and the lid 33 are provided in register with one another so as not to be overlapped with the rotation actuating plate 62. The transparent windows 75, 76 may also be fitted with plates of transparent synthetic resin.

The disc reproducing apparatus, on which the above-described disc cartridge container 30 is loaded, and which is adapted for reproducing information signals recorded on the optical disc 5 or 25 contained in the disc cartridge 5 or 25, respectively, contained in each cartridge container section 35 of the disc cartridge container 30, is hereinafter explained.

The disc reproducing apparatus has enclosed therein a mechanism for selecting one of the disc cartridges 1 or 21 contained and held within the cartridge container sections 35 of the cartridge container 30 loaded in a disc cartridge container holder 81 arranged within an outer casing constituting the main member of the apparatus for reproducing information signals, such as music signals, recorded on the optical disc 5 or 25 contained in the selected disc cartridge 1 or 21.

Figure 12:
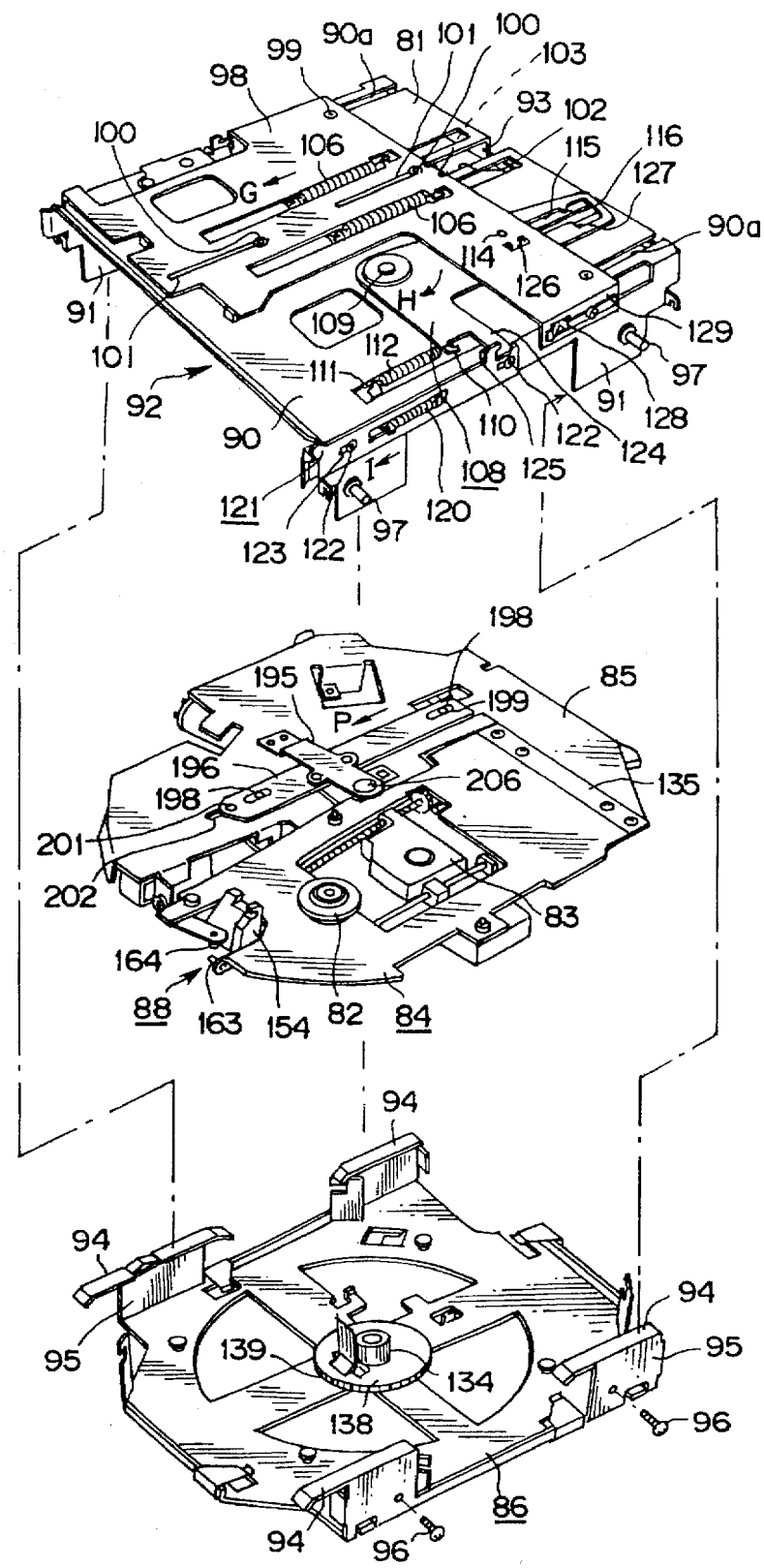
FIG. 12 is an exploded perspective view showing a disc reproducing apparatus according to the present invention.

As shown in FIG. 12, the mechanism for selecting one of the disc cartridges 1 or 21 contained and held within the cartridge holders 35 for reproducing information signals, such as music signals, recorded on the optical disc 5 or 25 contained in the selected disc cartridge 1 or 21, is mainly comprised of a rotatable supporting substrate 85 supporting a driving part supporting substrate 84 having loaded thereon a disc rotation driving mechanism 82 and an optical pickup 83 as information signal reading means, a stationary part supporting substrate 86 rotatably supporting the rotatable supporting substrate 85, a rotation driving mechanism 87 for rotating the rotatable supporting substrate 85 for shifting the disc rotation driving mechanism 82 and the optical pickup 83 loaded on the driving part to a position in register with one of the disc cartridges 1 or 21 contained and held by the cartridge container sections 35 of the disc cartridge container 30, and a driving part supporting substrate lift mechanism 88 for lifting the driving part supporting substrate 84 for shifting the disc rotation driving mechanism 82 and the optical pickup 83 towards and away from the disc cartridge 1 or 21 contained in the cartridge container section 35.

Figure 13:
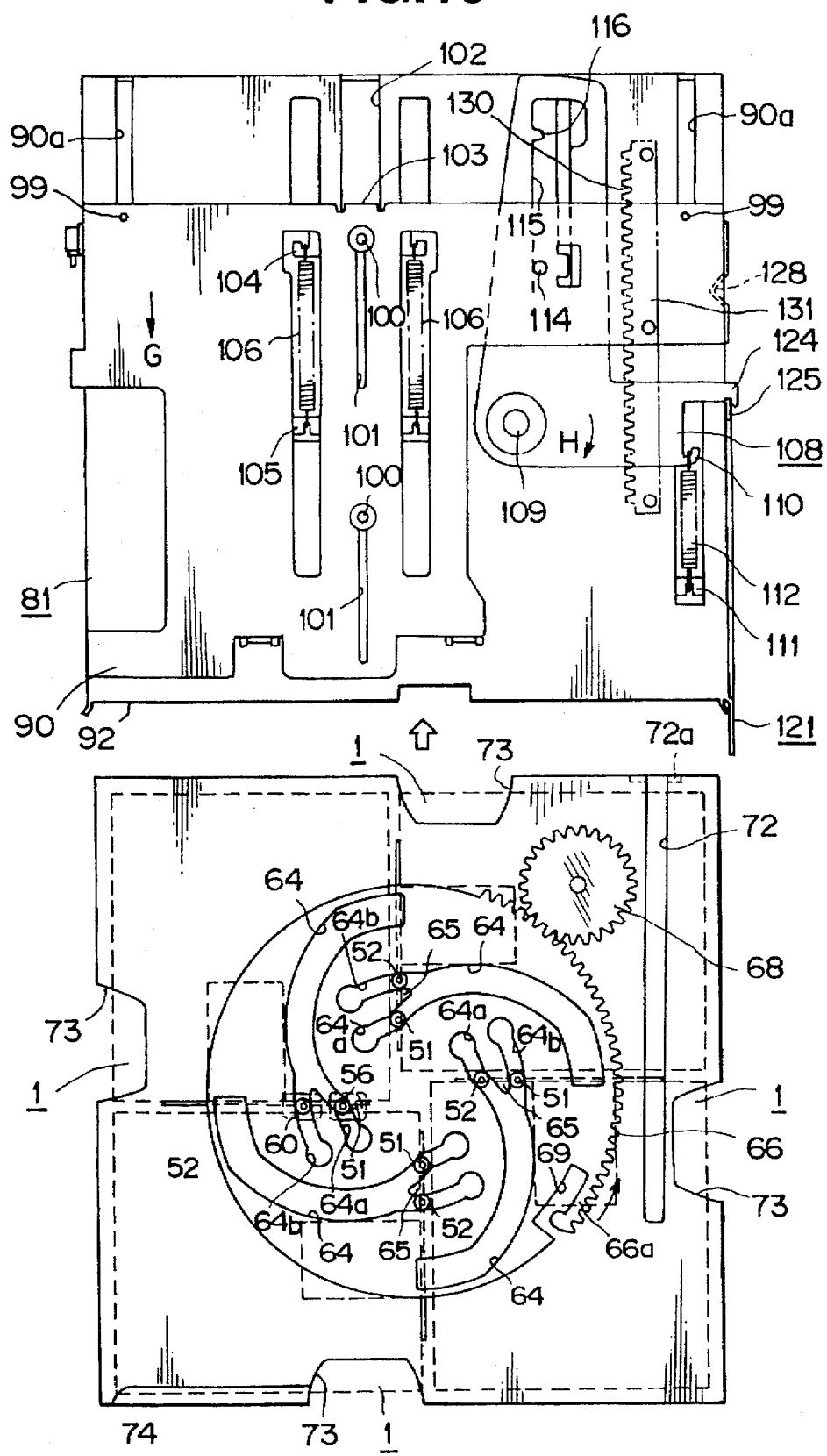
FIG. 13 is a plan view showing a disc cartridge container according to the present invention and a disc cartridge container holder on which the disc cartridge container is loaded.

The disc cartridge container holder 81 for loading the disc cartridge container 30 is rectangular in profile and includes an upper plate 90 having a width approximately equal to the width of the disc cartridge container 30 and formed with sidewall members 91, 91 on opposite lateral sides thereof, as shown in FIGS. 12 and 13. The rear side of the upper plate 90 opposite to the forward end thereof having the container inserting/detachment opening area 92 via which the cartridge container 30 is inserted or removed is formed with an insertion controlling wall member 93 for checking for excess insertion of the disc cartridge container 30 loaded into the disc cartridge container holder 81.

The disc cartridge container holder 81 is mounted on the fixed part supporting substrate 86 by stacking the sidewall members 91, 91 of the holder 81 on a pair of sidewall members 95, 95 set on both opposing lateral sides of the fixed part supporting substrate 86 and by mounting set screws 96 in position. The spacing defined between the upper plate 90 of the disc cartridge container holder 81 and container supporting lugs 94 formed by bending the upper edges of the sidewall members 95, 95 of the fixed part supporting substrate 86 parallel to the upper plate 90 is used as a loading section for loading the disc cartridge container 30 therein.

Meanwhile, the fixed part supporting substrate 86 is mounted on an outer casing by having supporting pins 97 supported on the outer casing via resilient supporting members having the shock absorbing function. The supporting pins 97 are protuberantly mounted on the outer peripheral surfaces of the sidewall members 91, 91 of the disc cartridge container holder 81 mounted on the fixed part supporting substrate 86.

An ejection plate 98 for ejecting the disc cartridge holder 30 loaded on the disc cartridge container holder 81 is mounted on the top plate 90 of the holder 81. The ejection plate 98 is mounted for movement along the direction of insertion and detachment of the disc cartridge container 30 loaded in the disc cartridge container holder 81 by having slide guide pins 99 engaged in plural slide guide grooves 90a formed in the top plate 90 and by having a slide guide pin 100 on the top plate 90 engaged in a slide guide groove 101. The rear end of the ejection plate 98 is formed with a thrust lug 103 intruded into the inside of the disc cartridge container holder 81 via a notch 102 formed in the top plate 90. The thrust lug 103 is adapted for being thrust by the disc cartridge container 30 loaded on the disc cartridge container holder 81 while thrusting the disc cartridge container 30 for ejection.

The ejection plate 98 is permanently biased by tension springs 106, 106 installed between a pair of spring retainers 104, 104 formed by partially segmenting the ejection plate 98 and a pair of spring retainers 105, 105 formed in the top plate 90. That is, the ejection plate 98 is biased in the direction of expelling the disc cartridge container 30 loaded on the disc cartridge container holder 81 out of the disc cartridge container holder 81.

On the top plate 90 of the disc cartridge container holder 81 is mounted a substantially L-shaped locking plate 108 by means of which the ejection plate 98 slid in the direction opposite to that shown by an arrow G in FIG. 13 against the bias of the tension springs 106, 106 by having the thrust lug 103 being thrust by the disc cartridge holder 30 loaded on the disc cartridge container holder 81 is maintained at the disc cartridge container loading position. The locking plate 108 is carried by a supporting shaft 109 set on the top plate 90 for rotation about the supporting shaft 109 and is perpetually rotationally biased in the direction shown by an arrow H in FIGS. 12 and 13 by a tension spring 112 mounted between a spring retainer 110 and another spring retainer 111 formed in a part of the top plate 90.

The opposite end of the locking plate 108 is formed with a rotation control groove 115 on one lateral side of which is slidingly contacted a mating lock pin 114 set on the ejection plate 98. A lock lug 116 adapted for engaging with the mating lock pin 114 is formed protruding into the rotation control groove 115 at the distal end of the lateral side of the rotation control groove contacted with the mating lock pin 114. The mating lock pin 114 is engaged with the lock lug 116 in such a manner that, as the ejection plate 98 is thrust by the disc cartridge holder 30 loaded on the disc cartridge container holder 81 so as to be moved to a disc cartridge container loading position, the mating lock pin 114 is moved as it is contacted with the lateral side of the rotation control groove 115, the mating lock pin 114 riding on the lock lug 116 while causing the locking plate 108 to be rotated against the bias of the tension spring 112. When the mating lock pin 114 rides over the lock lug 116, the locking plate 108 is rotated backwards in the direction shown by the arrow H in FIG. 13 under the bias of the tension spring 112 for engaging the mating lock pin 114 with the lock lug 116. As a result thereof, the ejection plate 98 is locked at a position in which the disc cartridge holder 30 has been loaded on the disc cartridge container holder 81.

On one of the lateral sides 91 of the disc cartridge container holder 81 is mounted an ejection lever 121 adapted for rotating the locking plate 108 against the force of the tension spring 112 for disengaging the mating lock pin from the locking lug 116 for rotating the ejection plate 98 by the tension springs 106, 106 in the direction shown by the arrow G in FIGS. 12 and 13 for ejecting the disc cartridge holder 30 loaded on the disc cartridge container holder 81. The ejection lever 121 is slidably mounted on the disc cartridge container holder 81 by having elongated openings 123, 123 formed therein engaged by slide guide pins 122, 122 set on one of the lateral side 91 of the disc cartridge container holder 81. The upper edge of the distal end of the ejection lever 121 is formed with a locking plate rotating lug 125 adapted to be engaged with a mating lug 124 protruded from one end of the locking plate 108. The ejection lever 121 is biased by a tension spring 120 mounted between it and the lateral side 91 so as to be moved in the direction shown by an arrow I in FIG. 12 which is the direction of backward rotation of the locking plate 108.

For ejecting the disc cartridge container 30 by unlocking the ejection plate 98 which has been locked at a position of loading the disc cartridge container 30 on the disc cartridge container holder 81, the ejection lever 121 is moved in the direction opposite to that shown by the arrow I in FIG. 12 against the bias of the tension spring 120. By such movement of the ejection lever 121, the locking plate 108 is rotated in the direction opposite to that shown by the arrow H in FIG. 12, against the bias of the tension spring 112, for unlocking the mating lock pin 114 from the lock lug 116. The ejection plate 98 is moved in the direction shown by the arrow G in FIG. 12, under the bias of the tension springs 106, 106, for thrusting the disc cartridge holder 30 by the thrust lug 103 for ejecting the disc cartridge holder 30 from the disc cartridge container holder 81.

A step notch 127 for retaining a retention lug 126 formed by partially segmenting the ejection plate 98 is formed on the lateral side of the rotation control groove 115 of the locking plate 108 opposite to the lateral side thereof carrying the lock lug 116. The purpose of providing the step notch 127 is to cause the retention lug 127 to abut on the step notch 127 to inhibit abrupt movement of the ejection plate 98 when the ejection plate 121 is actuated to rotate the locking plate 108 against the bias of the tension coil spring 112 for disengaging the mating lock pin 116 from the lock lug 116, that is to produce the movement of the ejection plate 98 in association with the release of the thrusting of the ejection lever 121 to inhibit abrupt ejection of the disc cartridge holder 30.

The ejection plate 98 mounted on the disc cartridge container holder 81 has a depending tab 129 which is superimposed on the lateral side 94 of the disc cartridge container holder 81 has a disc cartridge container thrusting member 128 in the form of a plate spring which is protruded via a cut-out formed in the lateral wall 94 into the inside of the holder 81 for thrusting and supporting the lateral side of the disc cartridge container 30 loaded on the disc cartridge container holder 81 for controlling the horizontal mounting position of the disc cartridge container 30.

Figure 14:
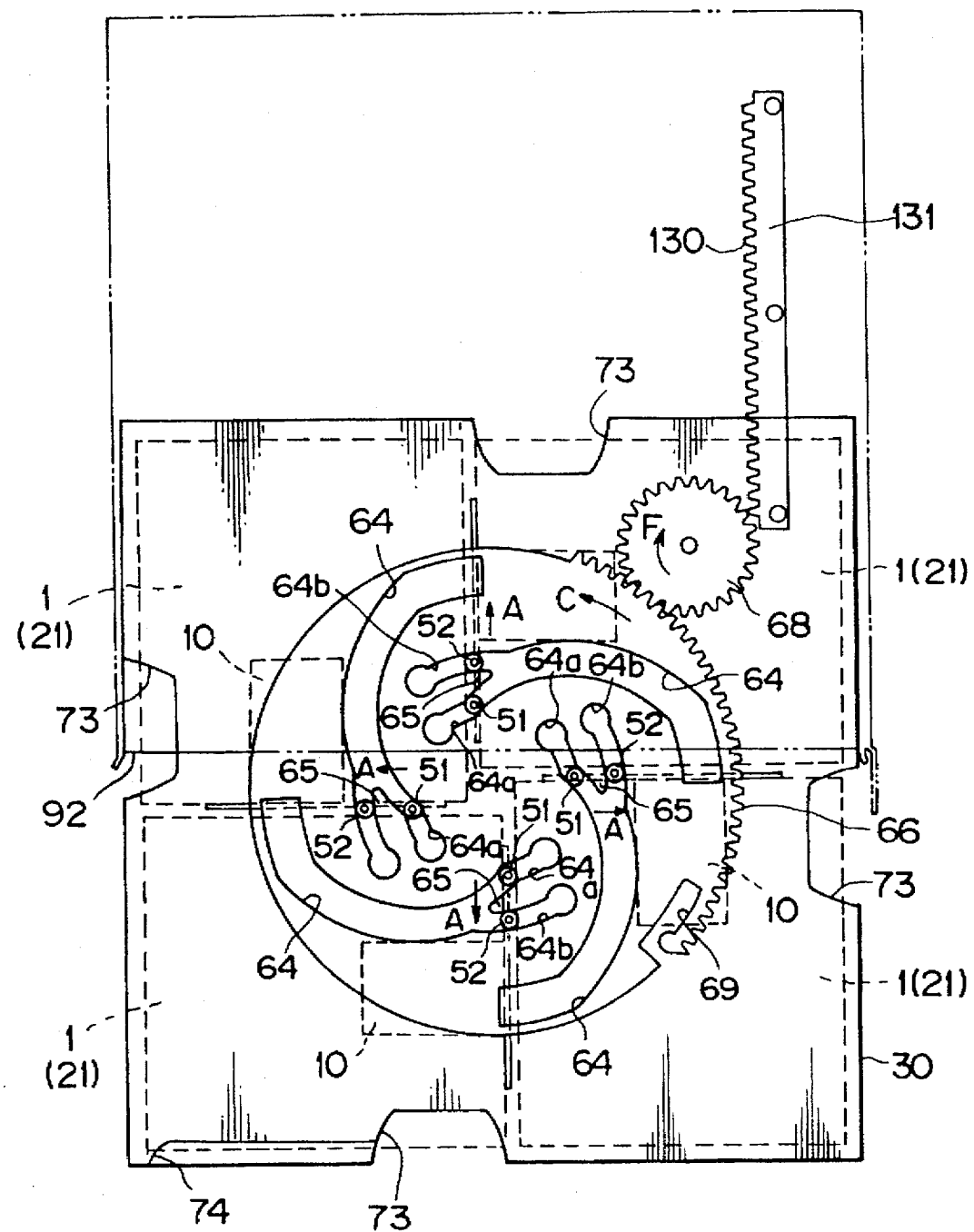
FIG. 14 is a plan view showing the state in which the disc cartridge container is introduced into a disc cartridge container holder and a rotation actuating gear is engaged with a rack gear.

On the inner lateral surface of the top plate 90, which is the inner lateral surface of the disc cartridge container holder 81, there is mounted a rack gear 131 by being engaged in a rack plate engaging recess formed by partially segmenting the lid 33 of the disc cartridge container 30 loaded on the disc cartridge container holder 81 for meshing with the rotation actuating gear 68 adapted for rotating the rotation actuating plate 62. The rack plate 131 is provided at a position of being engaged with the rack plate engagement groove 72 when the disc cartridge container 30 is loaded correctly from the inserting end on to the disc cartridge container holder 81, as shown in FIG. 14. That is, the rack plate 131 is mounted at a position offset towards one of the lateral sides 95 of the disc cartridge container holder 81.

The rack plate 131 is L-shaped in cross-section and is designed so that the rack gear 130 is protruded from its upper side. The rack plate engagement groove 72 formed in the disc cartridge container holder 81 has a broad opening end 72a, that is it has a broad inserting end for the rack plate 131. Consequently, when the rack plate 131 is engaged in the engagement groove 72, the disc cartridge holder 30 is supported by the top plate 90 of the disc cartridge container holder 81 to prevent the disc cartridge container holder 81 being detached towards the lower side.

When the disc cartridge holder 30 is inserted via the container inserting/detachment opening area 92 into the disc cartridge container holder 81 fitted with the rack plate 131 carrying the rack gear 130, the rack plate 131 is engaged in the rack plate engagement groove 72 via the opening end 72a. When the disc cartridge holder 30 is inserted halfway into the disc cartridge container holder 81, the rack gear 130 of the rack plate 131 is engaged with the rotation actuating gear 68.

Since the engagement groove 72 is formed at an offset position towards one side, the insertion of the disc cartridge holder 30 into the disc cartridge container holder 81 is inhibited unless the disc cartridge holder 30 is inserted into the opening area 92 from the correct inserting direction, otherwise the rack plate 131 cannot be engaged in the engagement groove 72.

Figure 15:
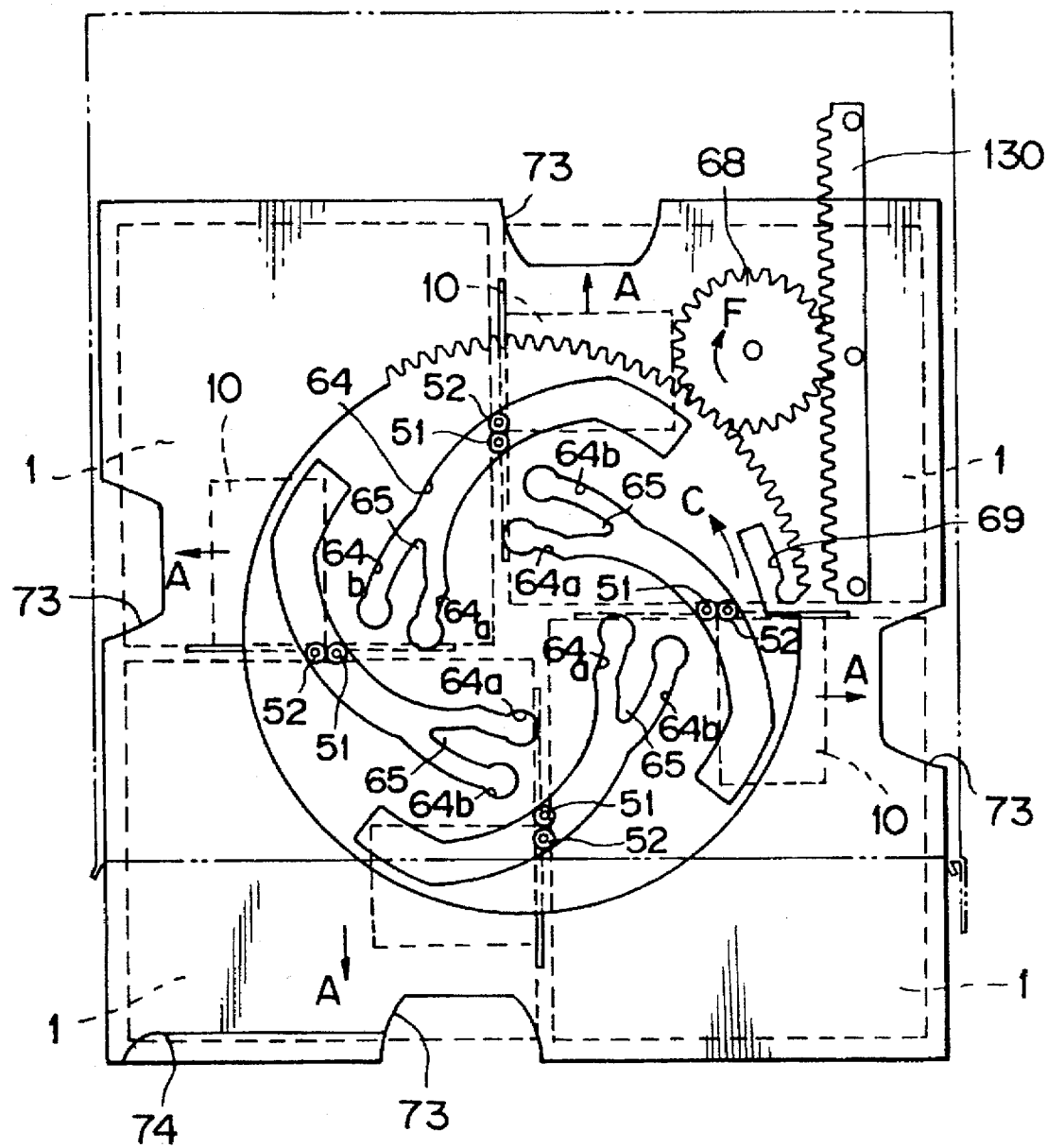
FIG. 15 is a plan view showing the state in which the disc cartridge container is introduced halfway into the disc cartridge container holder.
Figure 16:
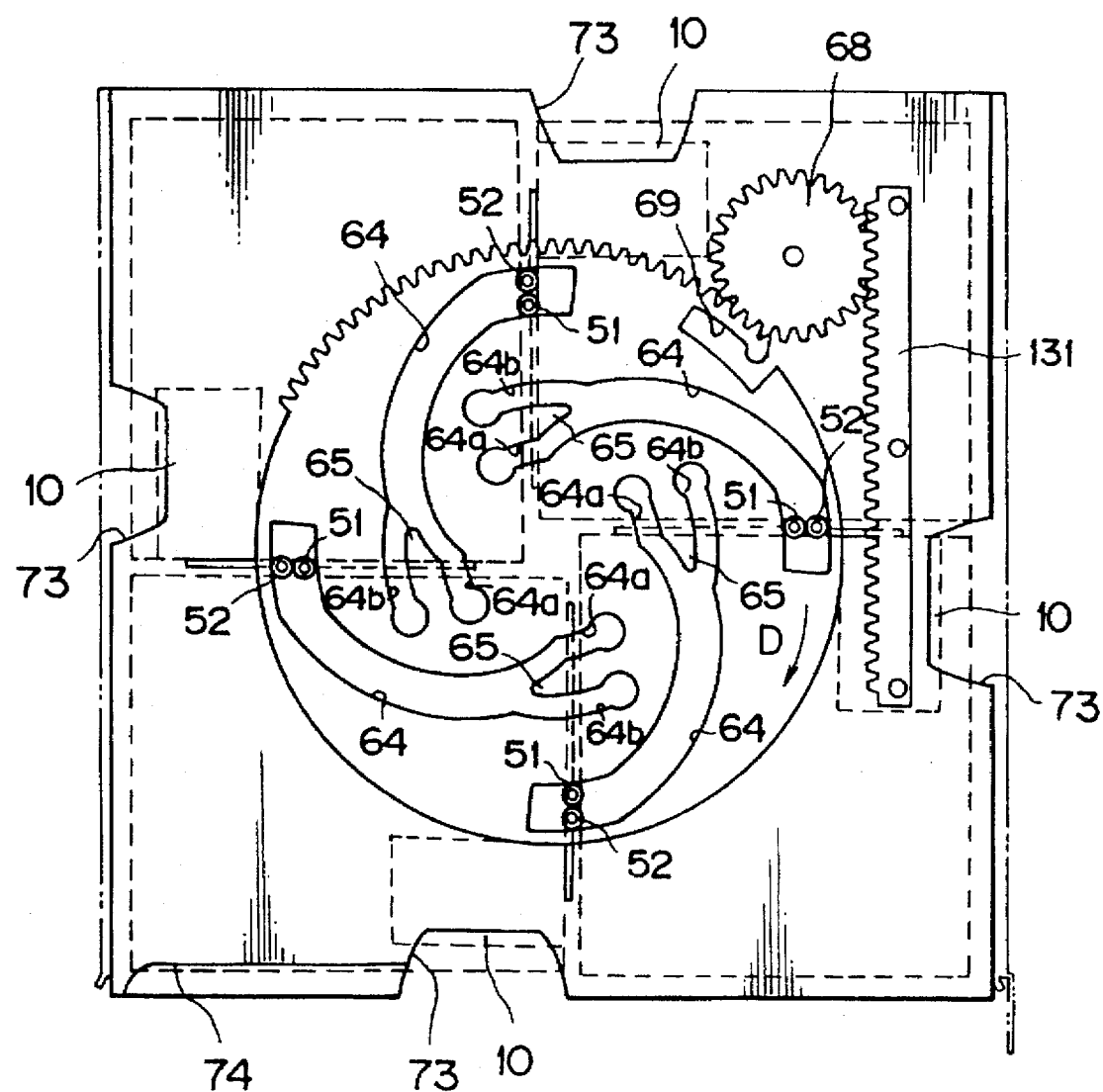
FIG. 16 is a plan view showing the state in which the disc cartridge container is loaded on the disc cartridge container holder.

If the disc cartridge container 30 is further inserted into the inside of the disc cartridge container holder 81, as shown in FIG. 14, the rotation actuating gear 68 is rotated in the direction shown by the arrow F in FIG. 14 by the relative movement between the disc cartridge holder 30 and the rack plate 131. By such rotation of the rotation actuating gear 68 in the direction shown by the arrow F in FIG. 14, the rotation actuating member 62 is rotated in the direction shown by the arrow C in FIG. 14 for moving shutter opening actuating member 51 and the shutter closure actuating member 52 in the direction shown by the arrow A in FIG. 14. With the movement of the shutter opening actuating member 51 in the direction shown by the arrow A in FIG. 14, the shutter member 10 or 22 of the disc cartridge 1 or 21 contained in the disc container section 35 is unlocked and the shutter member 10 or 22 is moved in the direction shown by the arrow A in FIG. 14 for opening the information signal recording/reproducing apertures 8 and 9 or the information signal recording/reproducing aperture 23. When the disc cartridge container 30 is inserted further into the inside of the disc cartridge container holder 81, the rotation actuating gear 68 meshing with the rack gear 130 is rotated in the direction shown by the arrow F in FIG. 15 for shifting the shutter member 10 or 22 to the position of completely opening the information signal recording/reproducing apertures 8 and 9 or the information signal recording/ reproducing aperture 23, as shown in FIG. 16. The information signal recording/reproducing apertures 8 and 9 or the information signal recording/reproducing aperture 23 are exposed to the outside via the aperture 41 formed in the disc cartridge holder 30, as shown in FIG. 16. When the disc cartridge container 30 is introduced into the inside of the disc cartridge container holder 81, the thrust lug 103 is thrust and actuated at the inserting end of the disc cartridge container 30 so that the ejection plate 98 is moved in the direction shown by the arrow G in FIG. 13 against the bias of the tension springs 106, 106. With the movement of the ejection plate 98, the mating lock pin 114 causes the locking plate 108 to be rotated in the direction opposite to that shown in FIG. 13 against the bias of the tension spring 112. When the disc cartridge holder 30 is inserted up to the loading position of the disc cartridge container holder 81, the locking plate 108 is rotated by the tension spring 112 in the direction opposite to that shown by the arrow H in FIG. 13, as the mating lock pin 114 rides on the lock lug 116. When the disc cartridge holder 30 is inserted up to the loading position for the disc cartridge container holder 81, the locking plate 108 is rotated by the tension spring 112 in the direction opposite to that shown by the arrow H in FIG. 13, the mating lock pin 114 being engaged with the lock lug 116 for maintaining the ejection plate 98 in the position of loading the disc cartridge container 30.

When the ejection plate 121 is thrust against the bias of the tension spring 112, the locking plate 108 is rotated in the direction opposite to that shown by the arrow H in FIG. 13 for disengaging the lock lug 116 from the mating lock pin 114 for shifting thee ejection plate 98 in the direction shown by the arrow G in FIG. 13 under the bias of the tension springs 106, 106. The disc cartridge container 30 is thrust and actuated by the thrust lug 103 for ejecting the disc cartridge container 30 out of the disc cartridge container holder 81. The rotation actuating gear 68 engaged with the rack gear 130 with the movement of the disc cartridge container 30 in the ejecting direction is rotated at this time in the direction opposite to that shown by the arrow F in FIG. 16 for rotating the rotation actuating plate 62 in the direction shown by the arrow D in FIG. 16. The shutter opening actuating member 51 and the shutter closure actuating member 52 are moved in the direction shown by the arrow B in FIG. 13 for moving the shutter member 10 or 22 of the disc cartridge 1 or 21 in the direction of closing the information signal recording/reproducing apertures 8 and 9 or the information signal recording/reproducing aperture 23. When the disc cartridge container 30 is ejected out of the disc cartridge container holder 81, the information signal recording/reproducing apertures 8 and 9 or the information signal recording/reproducing aperture 23 are completely closed by the shutter member 10 or 22.

Thus, when the disc cartridge container 30 is contained in the disc cartridge container holder 81, the information signal recording/reproducing apertures 8 and 9 or the information signal recording/reproducing aperture 23 of the disc cartridge 1 or 21 contained in each cartridge container 35 is opened, whereas, when the disc cartridge container 30 is ejected out of the disc cartridge container holder 81, the information signal recording/reproducing apertures 8 and 9 or the information signal recording/reproducing aperture 23 is closed, for assuring reliable protection of the optical disc 5 or 25 contained in the disc cartridge 1 or 21.

The rotatable supporting substrate 85 supporting the driving part supporting substrate 84 is rotatably supported on the stationary part supporting substrate 86 carrying the disc cartridge container holder 81, as shown in FIG. 12.

The rotatable supporting substrate 85 is prepared by punching a metal sheet and carries the driving part supporting substrate 84 in such a manner that the disc cartridge 1 or 21 contained in each cartridge container section 35 of the disc cartridge container 30 loaded on the disc cartridge container holder 81 is faced by the driving part supporting substrate 84 when the substrate 85 is rotatably mounted on the stationary part supporting substrate 86. On the driving part supporting substrate 84, there are mounted the disc rotation driving mechanism 82 for rotating the optical disc 5 or 25 contained in the disc cartridge 1 or 21 and the optical pickup 83 adapted for being moved along the radius of the optical disc 5 or 25 rotated by the disc rotation driving mechanism 82 for reading information signals, such as music signals, recorded on the optical disc 5 or 25, as shown in FIGS. 12 to 17. The driving part supporting substrate 84 is prepared by punching a metal sheet and has its proximal side supported in a cantilevered fashion by the stationary part supporting substrate 86 via a plate spring member 135 which is a resiliently deflectable supporting member. Consequently, the driving part supporting substrate 84 may be lifted in the direction normal to the plane of the stationary part supporting substrate 86 with the plate spring member 135 as a hinge for rotation. The lifting of the driving part supporting substrate 84 is taken charge of by the driving part supporting substrate lift mechanism 88 arranged as described subsequently.

Figure 17:
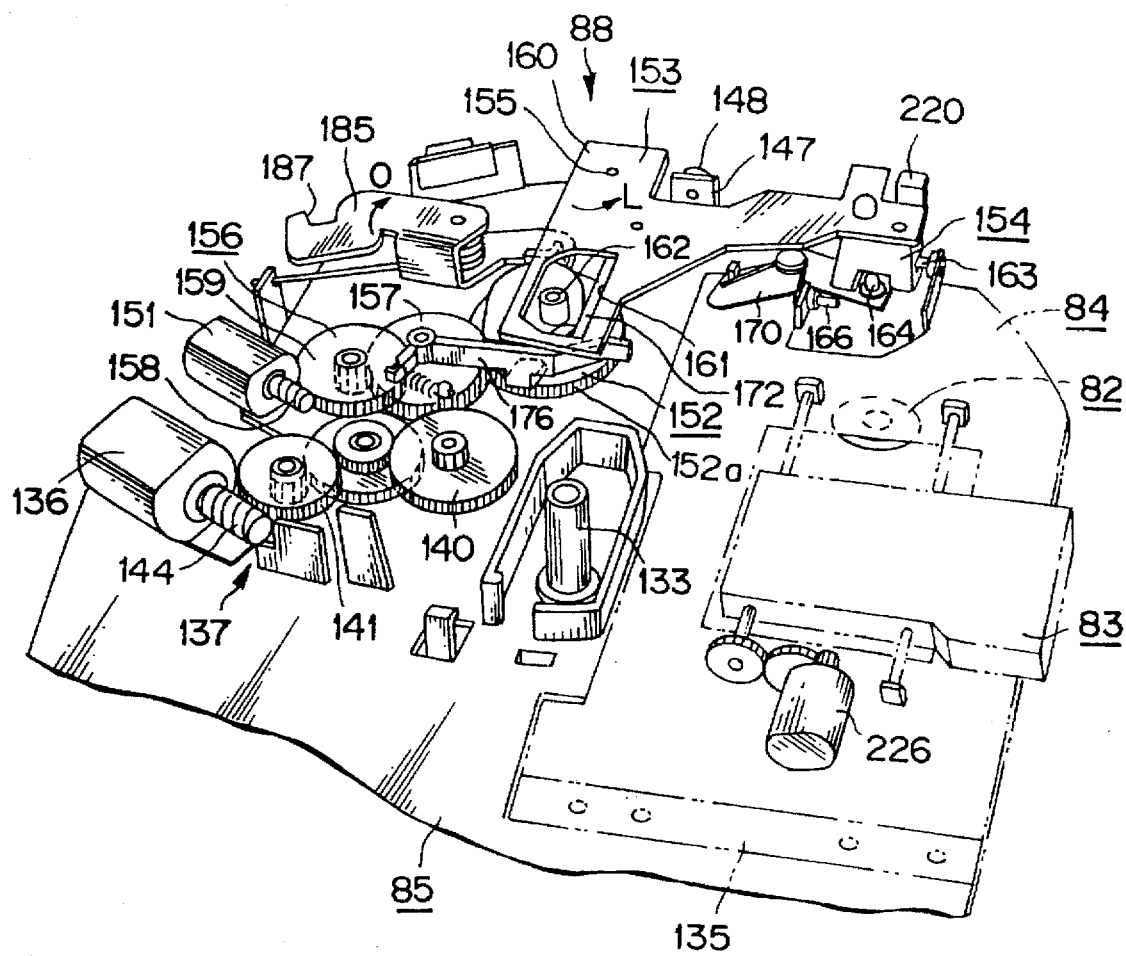
FIG. 17 is a partial perspective view of the bottom side of a disc reproducing apparatus showing essential parts of a driving part supporting substrate lift mechanism and a rotatable supporting substrate driving mechanism.

The rotatable supporting substrate 85 supporting the driving part supporting substrate 84 carrying the disc rotation driving mechanism 82 and the optical pickup 83 is rotatably supported relative to the stationary part supporting substrate 86 by having a rotation supporting shaft 133, shown in FIG. 17, at the center of rotation carried by a pivot 134 set on the stationary part supporting substrate 86. The rotatable supporting substrate 85 is rotated relative to the stationary part supporting substrate 86 by a rotatable supporting substrate rotationally driving mechanism 137 rotationally driven by a first driving motor 136. The rotatable supporting substrate rotationally driving mechanism 137 is made up of an intermediate gear 140 meshing with a gear part 139 formed on the perimeter of a gear plate 138 made fast with the pivot 134 set on the stationary part supporting substrate 86 and a driving force transmitting gearing 141 meshing with the intermediate gear 140. The intermediate gear 140 and the driving force transmitting gearing 141 are mounted on the rotatable supporting substrate 85. The driving force transmitting gearing 141 is made up of plural gears and is provided between a worm gear 144 mounted on a driving shaft of the first driving motor 136 and the intermediate gear 140 for transmitting the rotationally driving force of the first driving motor 136 to the intermediate gear 140.

When the first driving motor 136 is run in rotation, the rotationally driving force of the first driving motor 136 is transmitted via the gearing 141 and the intermediate gear 140 to the gear plate 138 mounted on the stationary part supporting substrate 86 so that the rotatable supporting substrate 85 is rotated relative to the stationary part supporting substrate 86 about the rotation supporting shaft 133 as the center of rotation.

Figure 18:
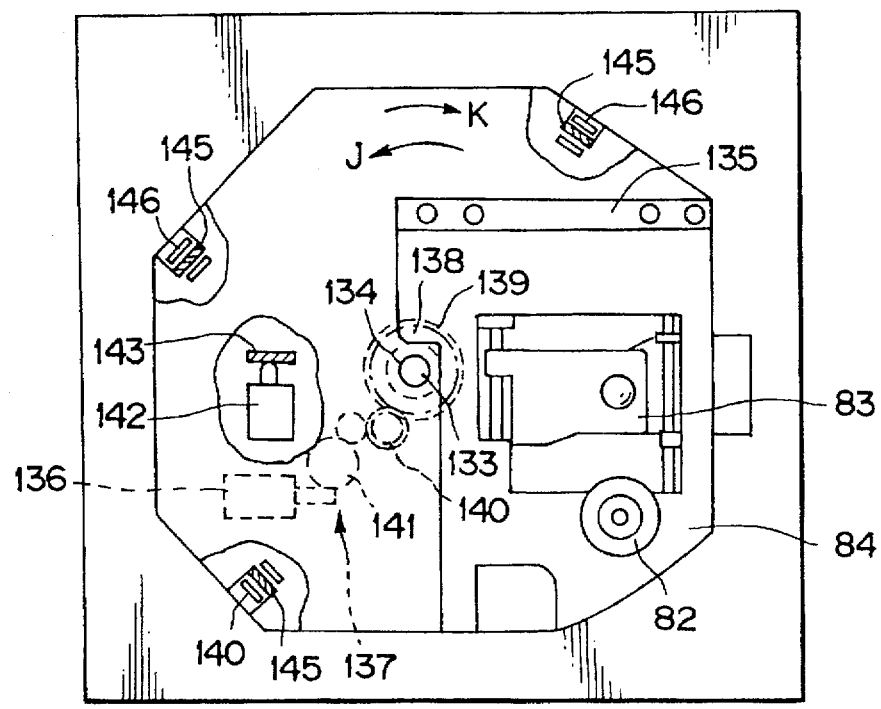
FIG. 18 is a plan view showing the state in which the rotatable supporting substrate carrying the driving part supporting substrate is at an initial position.

Meanwhile, in the initial state prior to starting the reproduction of the optical disc 5 or 25, the rotation supporting substrate 85 is maintained at a position in which the disc rotation driving mechanism 82 and the optical pickup 83 have been rotated to a position of facing the designated one of four cartridge container sections 35 of the disc cartridge container 30 loaded on the disc cartridge container holder 81, as shown in FIG. 18. The reason for controlling the rotatable supporting substrate 85 in this manner is to select the desired one of the four disc cartridges 1 or 21 contained in the disc cartridge container 30 to cause the selected disc cartridge 1 or 21 to be readily faced by the disc rotation driving mechanism 82 and the optical pickup 83.

Figure 19:
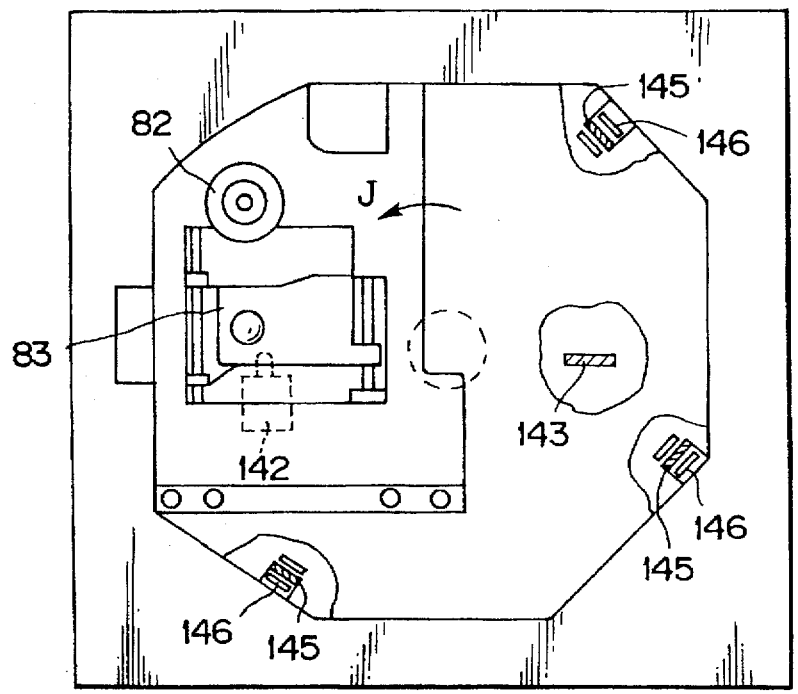
FIG. 19 is a plan view showing the state in which the rotatable supporting substrate carrying the driving part supporting substrate has been rotated relative to a stationary part supporting substrate.

That is, if the disc rotation and driving mechanism 82 and the optical pickup 83 are not in the position of facing the designated cartridge container section 35, as shown in FIG. 19, the first driving motor 136 starts to be driven for rotating the rotatable supporting substrate 85 on loading the disc cartridge container 30 on the disc cartridge container holder 81. The rotatable supporting substrate 85 is rotated in the counterclockwise direction shown by an arrow J in FIG. 19 until a switch actuator 143 provided on the lower surface of the stationary part supporting substrate 86 thrusts an initial position setting switch 142 provided on the stationary part supporting substrate 86. When initial position setting switch 142 is thrust and actuated by the switch actuator 143 as shown in FIG. 18, the rotation of the first driving motor 136 ceases and the rotation supporting substrate 85 is halted at an initial position in which the disc rotationally driving mechanism 82 and the optical pickup 83 face the address 1 cartridge container section 35. When the desired cartridge container 35 in the disc cartridge container 30 is selected, the first driving motor 136 starts to be rotated for rotating the rotation supporting substrate 85. The first driving motor 136 is halted after having rotated the rotation supporting substrate 85 to a position in which the disc rotation driving mechanism 82 and the optical pickup 83 are caused to face the selected cartridge container section 35.

Meanwhile, the selection of the desired one of the cartridge container sections 35 in the disc cartridge holder 30 and the movement of the disc rotation driving mechanism 82 and the optical pickup 83 are caused to occur by a detector 145 on the outer periphery of the rotation supporting substrate 85 detecting the passage of the detector by a photointerruptor 146 provided on the stationary part supporting substrate 86, as shown in FIG. 19. The detector 145 and the photointerruptor 146 are provided in association with each of the cartridge container sections 35 which is not in the initial position. The particular cartridge container section 35 is selected by the detector 145 counting the number of the photointerruptors 146 traversed by the detector. The address associated with each cartridge container section 35 is designated and the cartridge container section 35 having the specified address is specified by the detector 145 passing by the photointerruptors 146 a number of times equal to the number corresponding to the specified address. The rotation supporting substrate 85 is rotated in the clockwise direction as indicated by an arrow K in FIG. 18 until detection of the cartridge container section 35 having the selected address for shifting the disc rotation driving mechanism 82 and the optical pickup 83 to the position of facing the cartridge container section 35 bearing the selected address.

A plurality of rolls 148 are mounted on the outer periphery of the rotation supporting substrate 85 via plural supporting bent pieces, as shown in FIG. 17. The purpose of providing these rolls 148 is to assure smooth rotation of the rotation supporting substrate 85 on the stationary part supporting substrate 86.

The driving part supporting substrate lift mechanism 88, adapted for lifting the driving part supporting substrate 84 for loading the optical disc 5 or 25 on the disc rotationally driving mechanism 82 and approaching the optical pickup 83 to the optical disc 5 or 25 after rotating the rotation supporting substrate 85 for moving the disc rotationally driving mechanism 82 and the optical pickup 83 to a position of facing the disc cartridge 1 or 21 contained in the desired cartridge container section 35, is hereinafter explained.

The driving part supporting substrate lift mechanism 88 is mainly composed of a second driving motor 151 arranged on the rotation supporting substrate 85, a cam gear 152 rotationally driven by the second driving motor 151, a lift lever 153 rotationally driven in rotation by the rotation of the cam gear 152, and a lift block 154 mounted at the distal end of the lift lever 153.

The cam gear 152 is rotatably carried by a supporting shaft 155 set on the rotation supporting substrate 85. A gear part 156 is formed on the outer perimeter on the proximal side of the cam gear 152. The cam gear is run in rotation by the second driving motor 151 by the gear part 156 meshing with a first gear 157 of a drive transmission gearing 156 adapted for transmission of the rotationally driving force of the second driving motor 151. The second driving motor 151 is connected to the transmission gearing 156 by engaging a worm gear 158 mounted on a driving shaft of the second driving motor 151 with a helical gear 159 of the transmission gearing 156.

Figure 20:
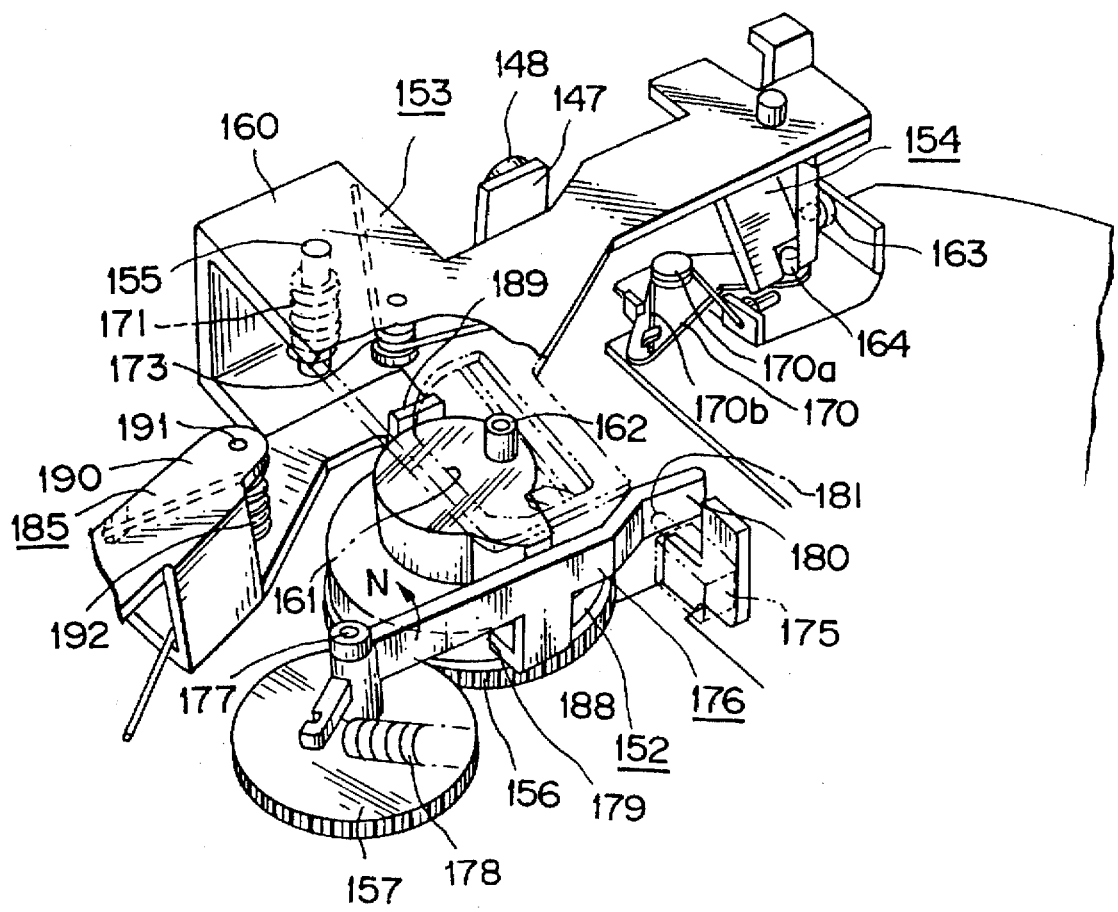
FIG. 20 is a perspective view showing essential parts of a driving part supporting substrate rotationally driven by a cam gear.
Figure 21:
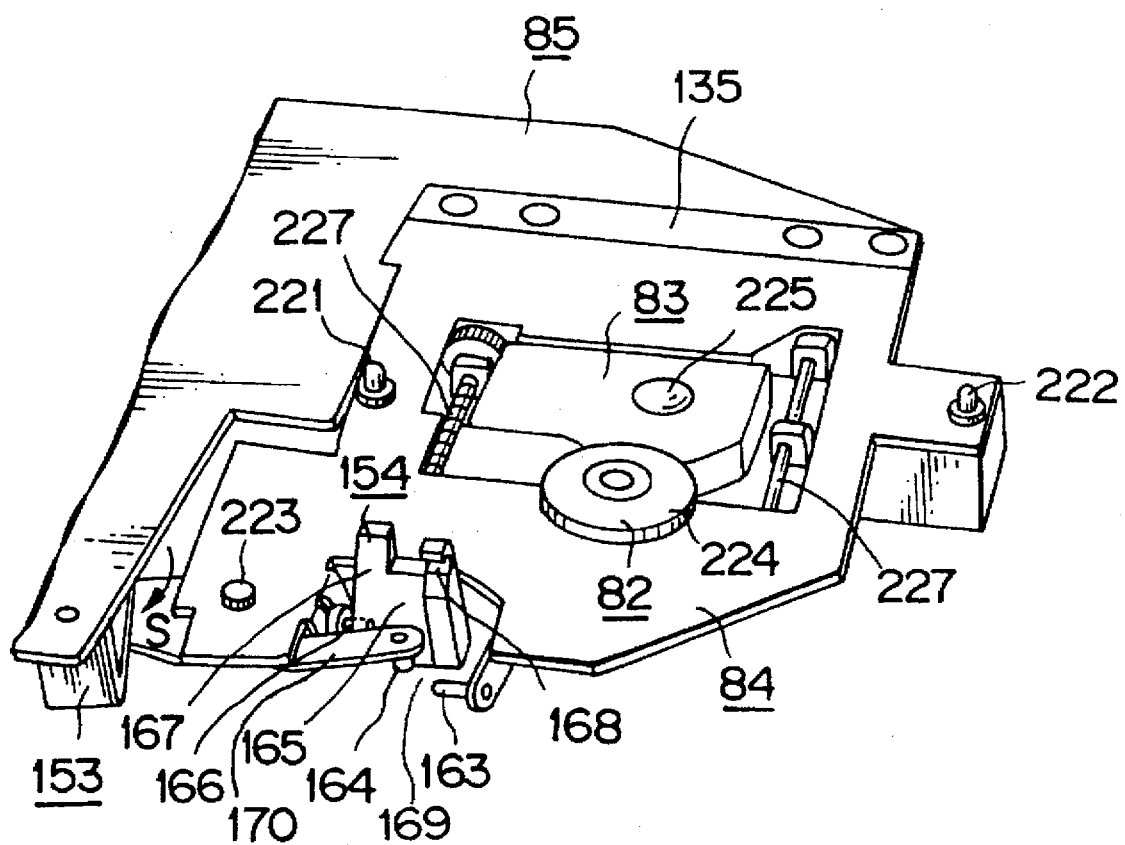
FIG. 21 is a perspective view showing the state in which the driving part supporting substrate carrying the disc rotation driving mechanism and the optical pickup is at the lowered position.

The lift lever 153 has its proximal side bent pivot section carried by a supporting shaft 155 set on the rotation supporting substrate 85 and is adapted for being rotated about the supporting shaft 155 as the center of rotation, as shown in FIG. 17. A pin engaging opening 161 substantially rectangular in shape is formed at the proximal side of the lift lever 153. A lift lever actuating pin 162 offset relative to the center of rotation of the cam gear 152 is engaged in the pin engaging opening 161, as shown in FIGS. 17 and 20. At the opposite distal end of the lift lever 153 is mounted the lift block 154 extended towards the distal side of the drive part supporting substrate 84 which is liftably supported by the rotation supporting substrate 85 and which is adapted for lifting the driving part supporting substrate 84 by the rotation of the lift lever 153. The lift block 154 has a first inclined cam 165 for having a sliding contact with a lift pin 164 provided at the distal end of the driving part supporting substrate 84 and a second inclined cam 167 for having sliding contact with a lift guide pin 166 provided at the distal end of the driving part supporting substrate 84, as shown in FIG. 21. The second inclined cam 167 is formed on the back side of the lift block 154 opposite to the first inclined cam 165. The lift block 154 has an engagement groove 168 in which a locking pin 163 provided on the distal end of the driving part supporting substrate 84 in opposition to the lift guide pin 166 is engaged for maintaining the driving part supporting substrate 84 at an elevated position when the driving part supporting substrate 84 is moved to its elevated position.

Meanwhile, the lift pin 164 is mounted for depending from the distal end of a spring plate 170 for being abutted against the first inclined cam 165 of the lift block 154. The spring plate 170 is protruded from a U-shaped cut-out 169 faced by the lift block 154 formed at the distal end of the driving part supporting substrate 84. That is, the spring plate 170 is mounted via a supporting shaft 170a on the distal end of the driving part supporting substrate 84 and is rotatably biased by a torsion coil spring 270b in a direction away from the lift block 154. The lift guide pin 166 is protruded from the lateral side of the U-shaped cut-out lee in a direction parallel to the plane of the driving part supporting substrate 84 into abutment with the second inclined cam 167. The lock pin 163 is protruded from the lateral side of the U-shaped cut-out 169 in a direction parallel to the plane of the driving part supporting substrate 84 into abutment with the lift block 154.

The lift lever 153 is rotationally biased at all times in the direction shown by an arrow L in FIG. 17 by a torsion coil spring 171 which is wound about the supporting shaft 155 and which has its one end retained by the driving part supporting substrate 84 and its other end by the lift lever 153. That is, the lift block 154 is rotationally biased in a direction away from the lift pin 164.

Figure 22:
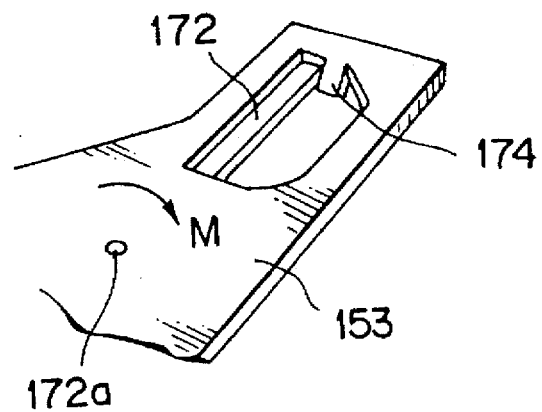
FIG. 22 is a partial perspective view showing a limiter mechanism provided on a lift lever.
Figure 23:
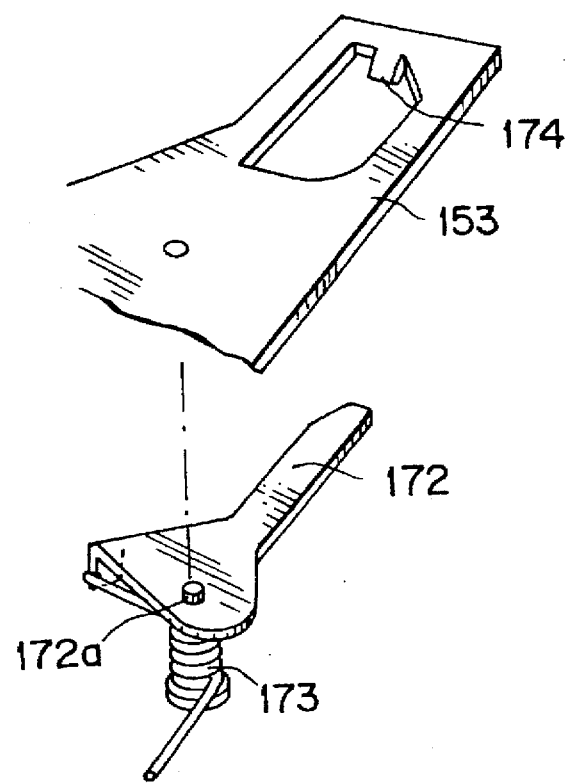
FIG. 23 is an exploded perspective view showing the limiter mechanism.

On the lift lever 153 is mounted a limiting plate 172 so that its one end is adapted for facing the pin engaging opening 161 engaged by the lift lever actuating pin 162 mounted on the cam gear 152. The limiting plate 172 is adapted for limiting excess rotation of the lift lever actuating pin 162 and has its one end carried by a supporting shaft 172a set on the lift lever 153 so as to be rotated about the supporting shaft 172a as the center of rotation, as shown in FIGS. 22 and 23. The limiting plate 172 is rotationally biased in a direction shown by an arrow M in FIG. 22, that is in a direction in which one end of the limiting plate 172 will face the inside of the pin engagement opening 161, by a torsion coil spring 173, which is coiled around the supporting shaft 172a and which has its one end retained by the lift lever 153 and its other end retained by the limiting plate 172. Meanwhile, the limiting plate 172 has its rotational bias position by the torsion coil spring 173 by having its distal end retained by a retainer 174 formed on the lift lever 153.

The cam gear 152 adapted for rotating the lift lever 153 is associated with a switch operating lever 176 adapted for actuating a changeover switch 175 adapted in turn for controlling the driving of the second driving motor 151 causing the rotation of the cam gear 152, as shown in FIG. 20. The switch operating lever 176 is rotatably mounted for rotation about a supporting pin 177 as the center of rotation by having its proximal end carried by a supporting shaft 177 set on the rotation supporting substrate 85. The switch operating lever 176 is rotationally biased in the direction shown by an arrow N in FIG. 20 by a tension spring 178 mounted under tension between the lever 176 and the rotation supporting substrate 85, and has its mid part abutted against a switch control cam 179 formed on the gear part 156 of the cam gear 156. A switch actuator 180 at the distal end of the switch operating lever 176 is adapted for facing an operator 181 of the changeover switch 175 mounted on the rotation supporting substrate 85.

By the rotation of the cam gear 152, the switch operating lever 176 is thrust by the switch control cam 179 so as to be rotated in the direction opposite to that shown by the arrow N in FIG. 20 against the bias of the tension spring 178, whereby the switch actuator 180 thrusts the operator 181 for changing over the changeover switch 175. The switch operating lever 176 actuates the changeover switch 175 so that, after the cam gear 152 is rotated by the second driving motor 151 for lifting the driving part supporting substrate 84, the switch operating lever 176 is rotated by being thrust by the switch control cam 179 of the cam gear 152 for halting the second driving motor 151.

Besides, the cam gear 152 is associated with a rotation supporting substrate lock lever 185 which, when the rotation supporting substrate 85 is rotated by the first driving motor 136 for shifting the disc rotationally driving mechanism 82 and the optical pickup 83 to a position of facing the desired one of the disc cartridges 1 or 21 contained in the cartridge container sections 35, causes the rotation supporting substrate 85 to be locked by the stationary supporting substrate 86. The rotation supporting substrate lock lever 185 has an engagement recess 187 engaged with a locking pin 186 set on the stationary supporting substrate 86 on its one side, while having a cam abutment section 189 abutted against a lock lever actuating cam 188 formed on the cam gear 152 on its other side. The rotation supporting substrate lock lever 185 has its U-shaped pivot section 190 formed at one intermediate portion carried by a supporting shaft 191 set on the rotation supporting substrate 85 so as to be rotated about the supporting shaft 191 as the center of rotation. The rotation supporting substrate lock lever 185 is rotationally biased in a direction shown by an arrow O in FIG. 20 in which the engagement recess 187 is engaged by the lock pin 186 by a torsion coil spring 192 which is coiled around the supporting shaft 191 and which has its one end retained by the rotation supporting substrate 85 and its other end retained by the rotation supporting substrate lock lever 185. When the disc rotation driving mechanism 82 and the optical pickup 83 not reproducing the optical disc 5 or 25 is at the lower position of being spaced apart from the disc cartridge 1 or 21 contained in the desired cartridge container section 35, the rotation supporting substrate lock lever 185 is placed at a position in which the cam abutment section 189 is thrust by the lock lever actuating cam 188, so that the rotation supporting substrate lock lever 185 is rotated against the bias of the torsion coil spring 192 for separating the engagement recess 187 away from the lock pin 186. That is, the rotation supporting substrate lock lever 185 renders the rotation supporting substrate 85 rotatable. When the disc rotation driving mechanism 82 and the optical pickup 83 face the desired disc cartridge 1 or 21 contained in the cartridge container section 35, and the cam gear 152 starts to be rotated for shifting the disc rotation driving mechanism 82 and the optical pickup 83 towards the disc cartridge 1 or 21, the state of thrusting actuation of the cam abutment section 189 by the lock lever operating cam 188 is released. The rotation supporting substrate lock lever 185 is rotated under the bias of the torsion coil spring 192 for engaging the engagement recess 187 with the lock pin 186 for positioning and locking the rotation supporting substrate 85.

The cam gear 152 is associated with a thrusting member actuating lever 197 adapted for actuating a disc cartridge container thrusting member 195 adapted in turn for thrustingly supporting the disc cartridge container 30 against the disc cartridge container holder 81 for preventing the shaking of the disc cartridge container 30 when the disc rotationally driving mechanism 82 and the optical pickup 83 are moved to a position proximate to the desired disc cartridge 1 or 21 contained in the cartridge container section 35 to enable replay of the optical disc 5 or 25 contained in the disc cartridge 1 or 21. The thrusting member actuating lever 197 has elongated openings 199, 199 engaged by a pair of slide guide pins 198, 198 set on the upper side of the rotation supporting substrate 85 so that the lever may be slid within the extent of these elongated openings 199, 199, while the lever is also biased by a tension spring 200 in the direction shown by an arrow P in FIG. 24, as shown in FIG. 12. Besides, the thrusting member actuating lever 197 has an engaging pin 201 at its one end. The thrusting member actuating lever 197 has an engaging pin 201 protruded at one end. The engaging pin is protruded towards the cam gear 152 via a through-hole 202 formed in the rotation supporting substrate 85 so as to be engaged in a cam groove, not shown, formed in the end face of the cam gear 152. By the rotation of the cam gear 152, the thrusting member actuating lever 197 is slid against the bias of the tension spring 200 by the engaging pin 201 being moved along a cam groove formed in the end face of the cam gear 152.

Figure 24:
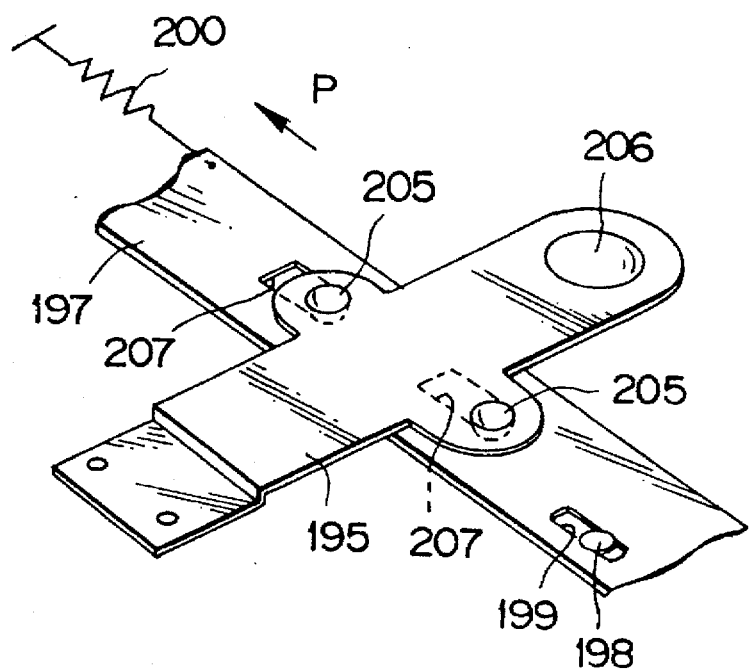
FIG. 24 is a partial perspective view showing a disc cartridge container thrusting member and a thrusting lever.
Figure 25:
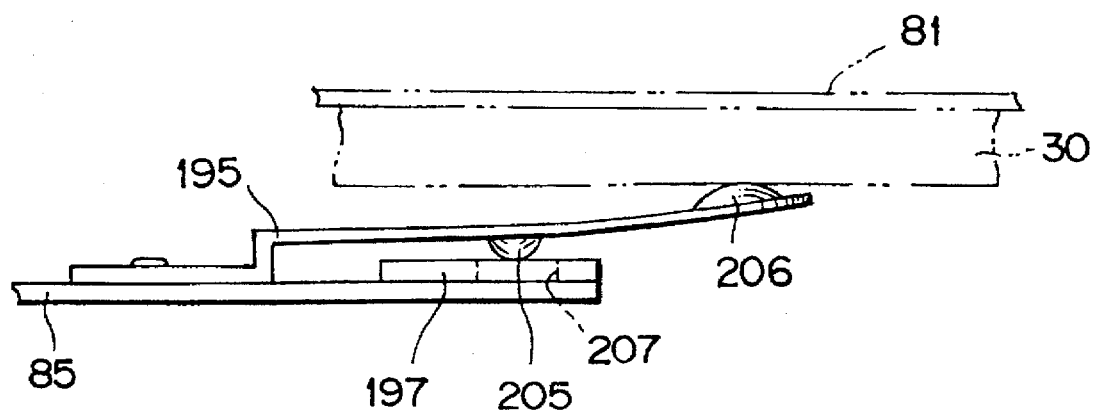
FIG. 25 is a schematic partial side view showing the state in which the disc cartridge container is thrust and supported by the disc cartridge container thrusting member.

On the other hand, the disc cartridge container thrusting member 195 is formed by a resiliently deflectable spring plate and, as shown in FIG. 24, is stacked and pressed onto the thrusting member actuating lever 197 in a crossed shape. The disc cartridge container thrusting member 195 has its proximal side secured to the rotation supporting substrate 85. The portion of the disc cartridge container thrusting member 195 overlapped with the thrusting member actuating lever 197 has a pair of bosses 205, 205 protruded towards the thrusting member actuating lever 197. Besides, the disc cartridge container thrusting member 195 has at its distal end a container thrusting section 206 for thrustingly supporting the disc cartridge holder 30. When the disc rotation driving mechanism 82 and the optical pickup 83 are not approached towards the disc cartridge 1 or 21, the disc cartridge container thrusting member 195 is displaced to a position in which the bosses 205, 205 are engaged in engagement openings 207, 207 formed in the thrusting member actuating lever 197, with the container thrusting section 206 being detached away from the disc cartridge container 30. When the cam gear 152 causes the disc rotation driving mechanism 82 and the optical pickup 83 in the direction of approaching the disc cartridge 1 or 21 for sliding thrusting member actuating lever 197 against the bias of the tension spring 200, the bosses 205, 205 are disengaged from the engagement openings 207, 207 to ride on the thrusting member actuating lever 197. When the bosses 205, 205 ride on the thrusting member actuating lever 197, the disc cartridge container thrusting member 195 is resiliently deflected in a direction in which the container thrusting section 206 approaches the disc cartridge holder 30 for thrusting the bottom of the disc cartridge container 30 by the container thrusting member 206, as shown in FIG. 25.

Besides, the thrusting member actuating lever 197 is associated with lock arm rotating levers 211, 211 which, when the disc rotationally driving mechanism 82 and the optical pickup 83 are moved to a position of approaching the desired disc cartridge 1 or 21 contained in the disc cartridge container 30 to enable replay of the optical disc 5 or 25 contained in the disc cartridge 1 or 21, causes the rotation of a pair of lock arms 210, 210 to cause the locking of the rotation supporting substrate 85 by the stationary part supporting substrate 86.

Figure 26:
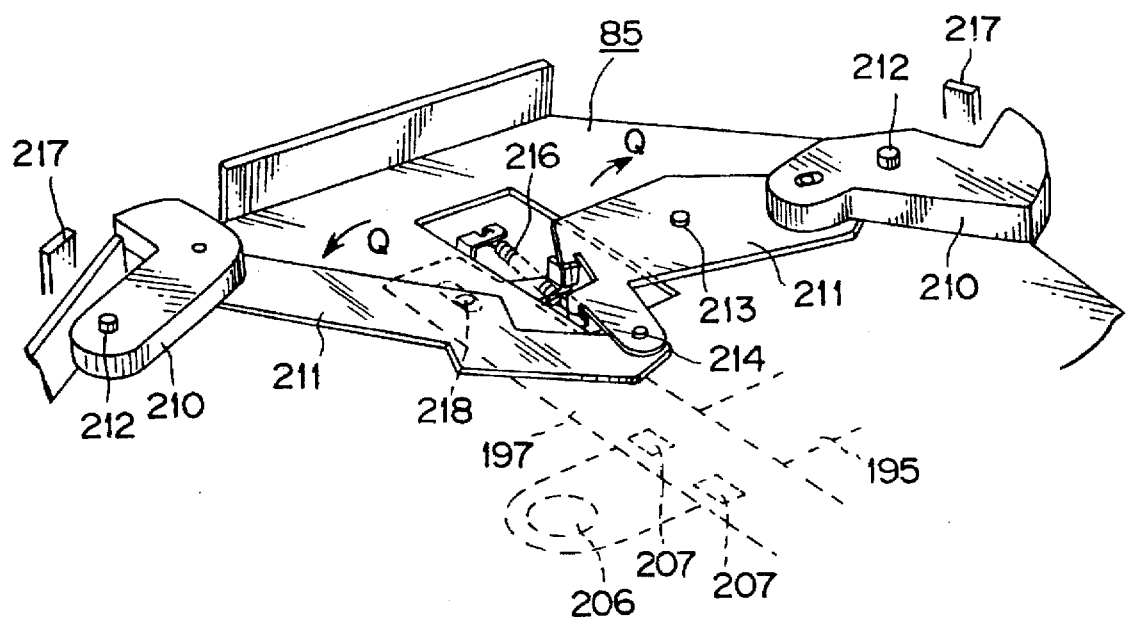
FIG. 26 is a perspective view showing a locking mechanism for locking the rotatable supporting substrate to the stationary part supporting substrate.

The lock arms 210, 210 are pivotally mounted on supporting shafts 212, 212 set on the rotation supporting substrate 85 so as to be rotated about these supporting shafts 212, 212 as the center of rotation. These lock arms 210, 210 are connected to the distal ends of the lock arm rotating levers 211, 211, as shown in FIG. 26. These lock arm rotating levers 211, 211 are pivotally mounted on supporting shafts 213, 213 set on the rotation supporting substrate 85 so that the lock arms will be rotated about these supporting shafts 212, 212 as the center of rotation. The distal ends of these lock arm rotating levers 211, 211 are connected together by a pivot pin 214 so as to be swung open or closed about the pivot pin as center. The lock arm rotating levers 211, 211 are rotationally biased in the opening direction shown by an arrow Q in FIG. 26 by a tension spring 216 mounted between one of the arms 211, 211 and the rotation supporting substrate 85. By the lock arm rotating levers 211, 211 rotationally biased in this manner, the lock arms 210, 210 are rotationally biased in the direction of being captured from the outside of the rotation supporting substrate 85 so as to be disengaged from retention pieces 217, 217 formed on the outer periphery of the rotation supporting substrate 85.

On the other hand, the lock arm rotating levers 211, 211 rotationally biased by the tension spring 216 are pivotally supported by the thrusting member actuating lever 197 via a fulcrum pin 218 set on the other of the levers 211, 211 and are intruded towards the thrusting member actuating lever 197 via a through-hole formed in the rotation supporting substrate 85.

When the thrusting member actuating lever 197 is in its initial position under the bias of the tension spring 200, the lock arm rotating levers 211, 211 are rotationally biased by the tension spring 216 in the opening direction shown by the arrow Q in FIG. 26 for capturing the lock arms 210, 210 into the inside of the rotation supporting substrate 85.

The operation since the loading of the disc cartridge container 30 containing the disc cartridge 1 or 21 in each cartridge container section 35 thereof on the disc cartridge container holder 81 of the disc reproducing apparatus until replay of the optical disc 5 or 25 contained in the disc cartridge 1 or 21 is explained.

When the disc cartridge container 30 is loaded on the disc cartridge container holder 81, a start switch, not shown, is actuated by the disc cartridge container 30 for starting the first driving motor 136 for rotating the rotation supporting substrate 85 in the counterclockwise direction indicated by the arrow J in FIG. 19 until a switch actuating piece 143 thrusts and actuates an initial position setting switch 142. The drive force of the first driving motor 136 is transmitted at this time to the gear part 139 of the stationary part supporting substrate 86 via the transmission gearing 141 and the intermediate gear 140 so that the rotation supporting substrate 85 carrying the first driving motor 136 is rotated relative to the stationary part supporting substrate 86 about the rotation supporting shaft 133 as the center of rotation.

When the initial position setting switch 142 is thrust and actuated by the switch actuating piece 143, the first driving motor 136 is halted for halting the disc rotation driving mechanism 82 and the optical pickup 83 at the initial position of facing the designated cartridge container section 35.

On actuation of a selection switch for selecting the cartridge container section 35 in the disc cartridge container 30 bearing the desired address, the first driving motor 136 is started for rotating the rotation supporting substrate 85 in the clockwise direction indicated by the arrow K in FIG. 18. With the rotation of the rotation supporting substrate 85, the detectors 145 provided on the outer periphery of the rotation supporting substrate 85 traverse the photointerruptors 146 provided on the stationary part supporting substrate 86. The number of times the detectors 145 traverse the photointerruptors 146 is counted and, when the position is reached in which the disc rotation driving mechanism 82 and the optical pickup 83 face the cartridge container section 35 positioned at the selected address, the first driving motor 136 is halted for halting the rotation of the rotation supporting substrate 85.

When the disc rotation driving mechanism 82 and the optical pickup 83 face the cartridge container 35 positioned at the selected address, the second driving motor 151 for the driving part supporting substrate lift mechanism 88 is started. When the second driving motor 151 starts its operation, the rotation driving power of the motor 151 is transmitted via the transmission gearing 156 to the cam gear 152 for rotating the cam gear 152 in the direction shown by an arrow R in FIG. 27. When the cam gear 152 is rotated in the direction shown by the arrow R in FIG. 27, the lift lever actuating pin 162 mounted on the cam gear 152 causes the lift lever 153 to be engaged in the pin engagement opening 161 in the direction shown by an arrow S in FIG. 17. That is, the lift lever actuating pin 162 causes the rotation of the lift lever 153 in the direction shown by the arrow S in FIG. 17, as the pin 162 thrusts the pin engagement opening 162.

As the lift lever 153 is rotated in the direction shown by the arrow S in FIG. 17, the lift pin 164 and the lift guide pin 166 mounted on the distal end of the driving part supporting substrate 84 are moved above the first inclined cam 165 and the second inclined cam 167, while having sliding contact with the cams 165 and 167, as shown in FIG. 21.

Figure 27:
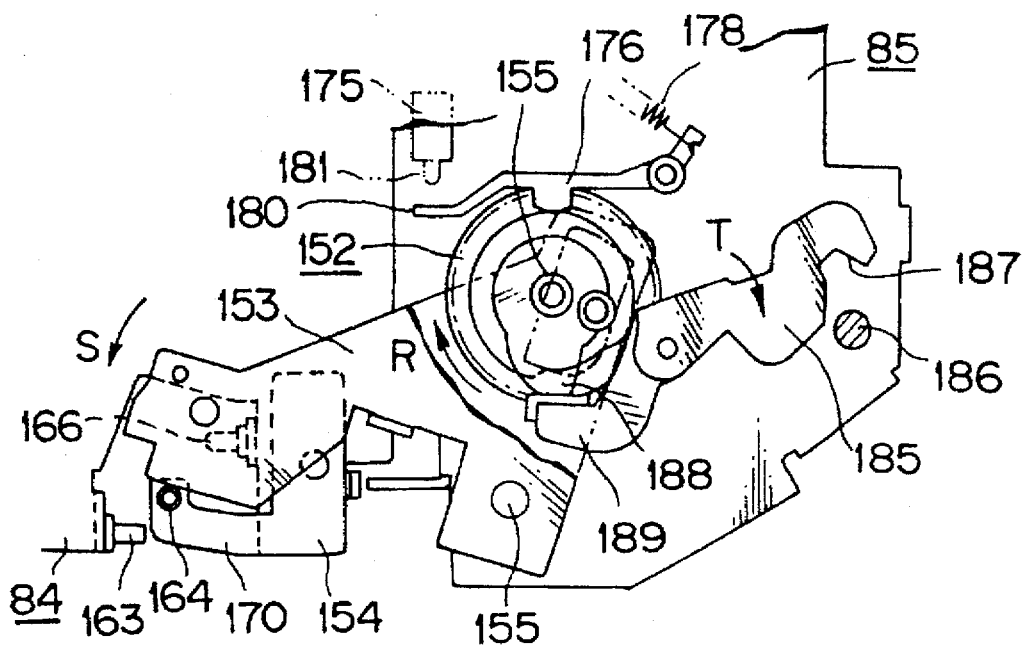
FIG. 27 is a plan view showing the state of rotation of the cam gear when the driving part supporting substrate is in the lowered position.
Figure 28:
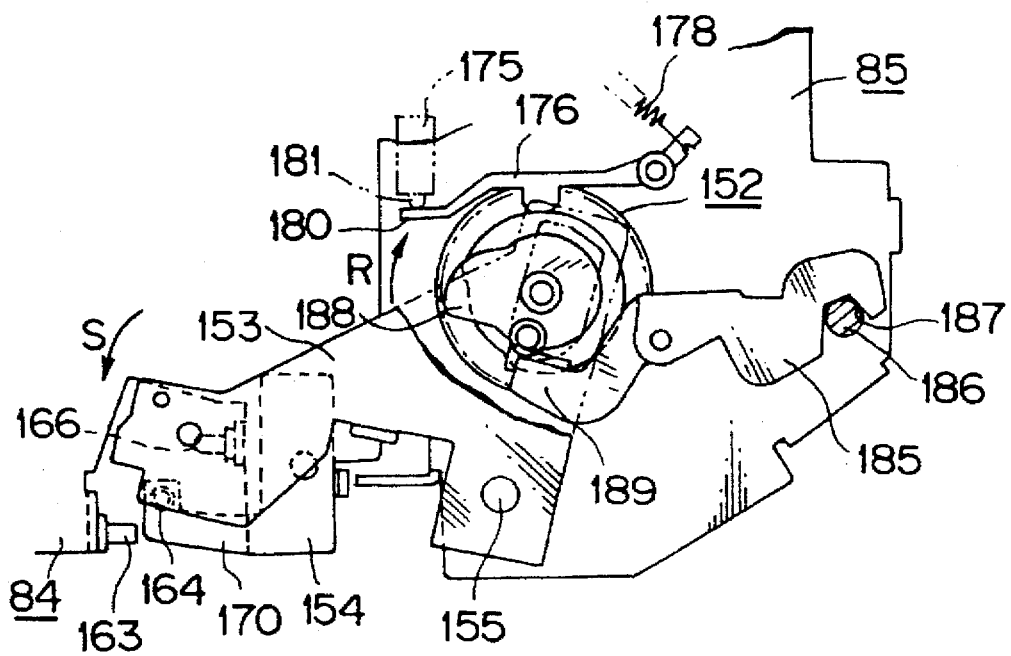
FIG. 28 is a plan view showing the state of rotation of the cam gear when the driving part supporting substrate is being raised.

On the other hand, when the cam gear 152 is rotated in the direction shown by the arrow R in FIG. 27, the rotation supporting substrate lock lever 185, having the cam abutment section 189 abutted against the lock lever actuating cam 188 provided on the cam gear 152, is rotated in the direction shown by an arrow T in FIG. 27 under the bias of the torsion coil spring 192. In the present embodiment, when the cam gear 152 is rotated 60° in the direction shown by the arrow R in FIG. 27, the engagement recess 187 formed in one end of the rotation supporting substrate lock lever 185 is engaged with the lock pin 186 provided on the stationary part supporting substrate 86, as shown in FIG. 28, for locking the rotation supporting substrate 85 relative to the stationary part supporting substrate 86. With the rotation supporting substrate lock lever 185 thus locked by the lock pin 186, the rotation supporting substrate lock lever 185 is correctly positioned for facing the disc rotation driving mechanism 82 and the optical pickup 83 to the cartridge container 35 positioned at the selected address.

If, after the cam gear 152 is rotated further in the direction shown by the arrow R in FIG. 28, after the rotation supporting substrate 85 is locked relative to the stationary part supporting substrate 86, the lift lever 153 is rotated in the direction shown by the arrow D in FIG. 28. The lift pin 164 and the lift guide pin 166 provided on the distal end of the driving part supporting substrate 84 are moved further above the inclined cams 165 and 167 while having sliding contact with the inclined cams 165 and 167. When the cam gear 152 is rotated substantially 160° in the direction shown by the arrow R in FIG. 29, the lift pin 164 reaches a horizontal section 165a on the upper surface of the first inclined cam 165, with the lift guide pin 166 being engaged in the engagement groove 168 formed on the upper surface of the second inclined cam 167. As a result thereof, the driving part supporting substrate 84 is raised towards the disc cartridge container 30 loaded on the disc cartridge container holder 81 about the spring plate 135, acting as a hinge.

Figure 29:
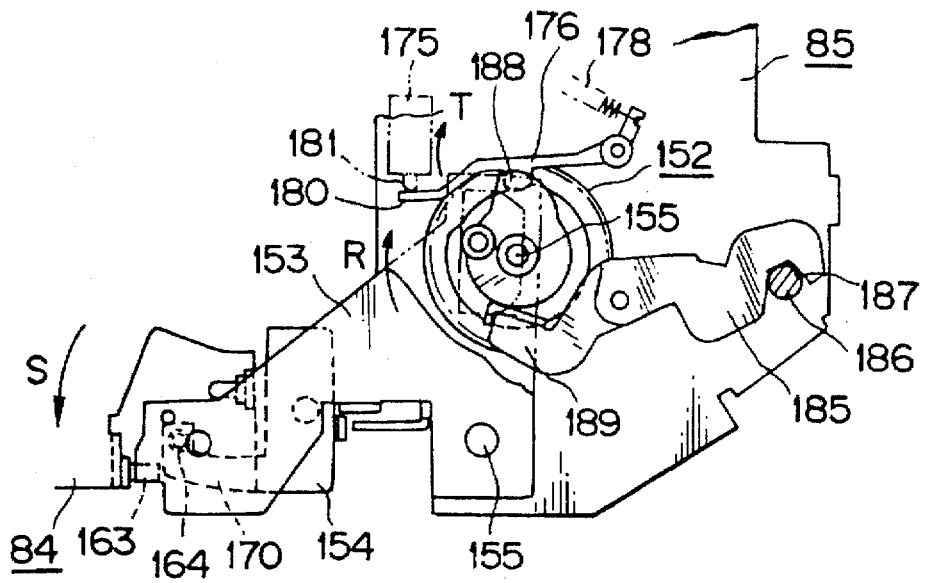
FIG. 29 is a plan view showing the state of rotation of the cam gear when the driving part supporting substrate has been raised.
Figure 30:
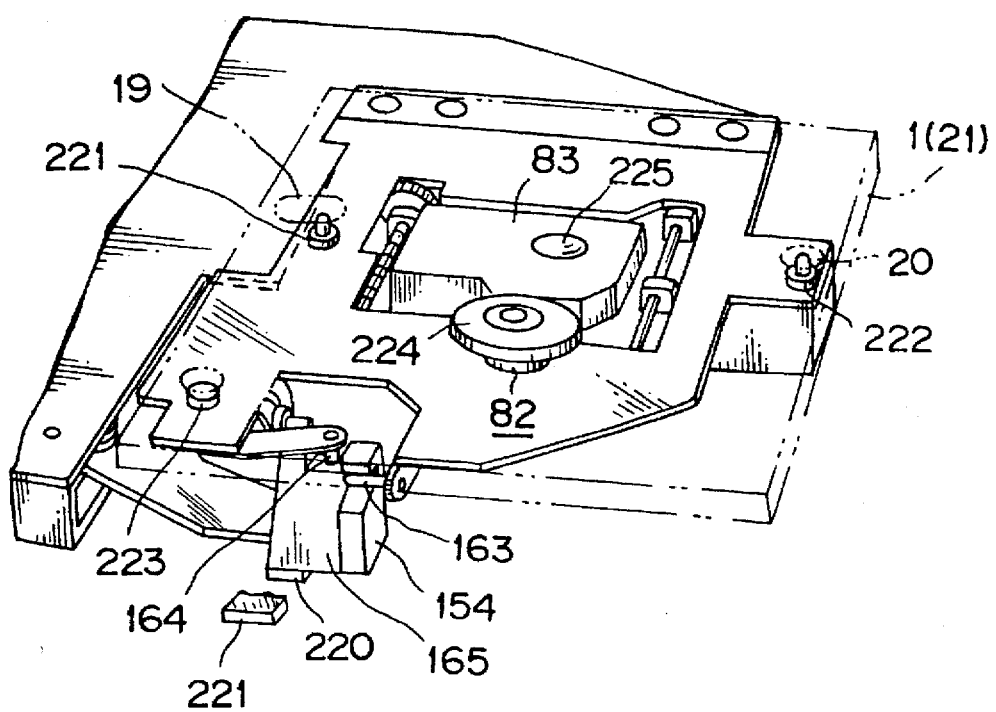
FIG. 30 is a perspective view showing the state of rotation of the cam gear when the driving part supporting substrate has been raised.

On the other hand, if the lift lever 153 is rotated in the direction shown by the arrow S in FIG. 29, until the driving part supporting substrate 84 is moved to its raised position, a retention piece 220 formed by bending the distal end of the lift lever 153 carrying the lift block 154 of the lift lever 153 is intruded towards the lower side of a lift lever thrusting and supporting spring 221 mounted on the stationary part supporting substrate 86. That is, the retention piece 220 is thrustingly supported on the stationary part supporting substrate 86 by the lift lever thrusting and supporting spring 221, as shown in FIG. 30, for non-rotatably supporting the lift lever 153. With the lift lever 153 being non-rotatably supported in this manner, the driving part supporting substrate 84 is positively kept in its raised position by the lift block 154.

When the cam gear 152 is rotated until the driving part supporting substrate 84 has been moved to its raised position, the thrusting member actuating lever 197 is slid by the cam gear 152 against the bias of the tension spring 200. By the thrusting member actuating lever 197 slid in this manner, the disc cartridge container thrusting member 195 is resiliently deflected for approaching the end boss 206 to the disc cartridge container 30 for supporting the bottom of the disc cartridge container 30 by the end boss 206, as shown in FIG. 25. The disc cartridge container 30 is thrustingly supported by the disc cartridge container holder 81 to prevent unwanted container movements in the holder 81.

Besides, as the thrusting member actuating lever 197 is slid, the lock arms 210, 210 are protruded outwardly of the rotation supporting substrate 85 into engagement with the retention pieces 217, 217 formed on the outer periphery of the stationary supporting substrate 86 for locking the rotation supporting substrate 85 relative to the stationary supporting substrate 86 for inhibiting inadvertent rotation of the rotation supporting substrate 85 during replay of the optical disc 5 or 25.

When the lift lever 153 is rotated in the direction shown by the arrow S in FIG. 29 until the driving part supporting substrate 84 has been moved to its raised position, the second driving motor 151 for rotationally driving the cam gear 152 is halted. That is, when the cam gear 152 is rotated through substantially 160°, the switch operating lever 176 is thrustingly actuated by the switch control cam 179 provided on the cam gear 152 and thereby rotated against the bias of the tension spring 178 in the direction shown by the arrow T in FIG. 28 by way of performing the changeover operation of the changeover switch 175. The second driving motor 151 is halted to complete the lifting of the driving part supporting substrate 84.

Meanwhile, when the driving part supporting substrate 84 is moved to its raised position, a pair of positioning pins 222, 222 set on the driving part supporting substrate 84 are intruded via the cut-out opening 42 and the cut-out 43 formed in the bottom wall 34 of the disc cartridge container 30 into the cartridge container section 35 into engagement in the positioning pin engagement openings 19, 20 of the disc cartridge 1 or 21 contained in the cartridge container section 35. Besides, a height setting pin 223 set on the driving part supporting substrate 84 supports the lower surface of the disc cartridge 1 or 21. The disc cartridge 1 or 21 is now supported on the driving part supporting substrate 84 with positioning along its height and in the horizontal direction. A disc table 224 of the disc rotation driving mechanism 82 loaded on the driving part supporting substrate 84 is protruded via the opening 41 in the bottom wall 34 of the disc cartridge container 30 into the inside of the cartridge container section 35 so as to be intruded into the disc table inlet opening 6 of the disc cartridge 1 or 21 contained in the cartridge container section 35. The optical disc 5 or 25 contained in the disc cartridge 1 or 21 is chucked on the disc table 224 for rotation in unison with the disc table. An objective lens 225 of the optical pickup 83 loaded on the driving part supporting substrate 84 is protruded via the opening 41 in the bottom wall 34 of the disc cartridge container 30 to face the signal recording area of the optical disc 5 or 25 in proximity thereto via the information signal recording/reproducing aperture 9 of the disc cartridge 1 contained in the cartridge container section 35 or the information signal recording/reproducing aperture 23 of the disc cartridge 21 in the cartridge container section 35.

When the optical disc 5 or 25 is chucked in this manner on the disc table 224 and the objective lens 225 of the optical pickup 83 is moved to a position proximate to the optical disc 5 or 25, the spindle motor of the disc rotationally driving mechanism 82 is started for rotationally driving the optical disc 5 or 25. With the rotation of the optical disc 5 or 25, the optical pickup 83 is fed from the inner towards the outer sides of the optical disc 5 or 25, by being guided along a pair of feed guides 227, 227 by a pickup feed motor 226, for reproducing information signals recorded on the optical disc 5 or 25.

When the replay of the optical disc 5 or 25 contained in the disc cartridge 1 or 21 contained in the cartridge container section 35 having the designated address comes to a close, the second driving motor 151 is again started for rotating the cam gear 152 in the same direction as that of raising the driving part supporting substrate 84. By such rotation of the cam gear 152, the lift lever 153 is rotated in the direction opposite to that shown by the arrow S in FIG. 29. The lift pin 164 and the lift guide pin 166, provided on the distal end of the driving part supporting substrate 84, are moved below the first inclined cam 165 and the second inclined cam 167 of the lift block 154, while having sliding contact with these cams. The driving part supporting substrate 84 is moved downwards under the force of resilient restoration of the spring plate 135. The rotation supporting substrate lock lever 185 is rotated at this time against the bias of the torsion coil spring 192 for disengaging the lock pin 186 from the engagement recess 187. The thrusting member actuating lever 197 is also reset to its initial position, under the bias of the tension spring 200, for releasing the thrusting support of the disc cartridge container 30 by the disc cartridge container thrusting member 195 while releasing the locking of the stationary supporting substrate 86 by the lock arms 210, 210. When the cam gear 152 is rotated substantially 350° in the direction shown by the arrow R in FIG. 29, the changeover operation of the changeover switch 175 is again effectuated by the switch actuator 180 to halt the driving of the second driving motor 151. This terminates the descent of the driving part supporting substrate 84 to permit the rotation of the rotation supporting substrate 85 about the rotation supporting shaft 133 as the center of rotation, as shown in FIG. 21.

When the descent of the driving part supporting substrate 84 is completed to enable the rotation of the rotation supporting substrate 85 about the rotation supporting shaft 133 as the center of rotation, the first driving motor 136 is started for rotationally driving the rotation supporting substrate 85 for shifting the disc rotationally driving mechanism 82 and the optical pickup 83 to a position in register with the cartridge container section 35 having the next designated address. The second driving motor 151 is then run for rotationally driving the cam gear 152 for lifting the driving part supporting substrate 84 as mentioned previously for reproducing the optical disc 5 or 25 contained in the disc cartridge 1 or 21 contained in the cartridge container section 35 having the next designated address. By the repetition of the replay operations of the optical disc 5 or 25, the optical disc 5 or 25 contained in the disc cartridge 1 or 21 contained in the disc cartridge container 30 may be reproduced sequentially.

In the above-described embodiment, the driving part supporting substrate 84 is lifted by rotating the cam gear 152 in one direction. It is however possible to modify the cam formed in the cam gear 152 so that the driving part supporting substrate 84 may be lifted by hi-directional rotation through 180° of the cam gear 152.

Figure 31:
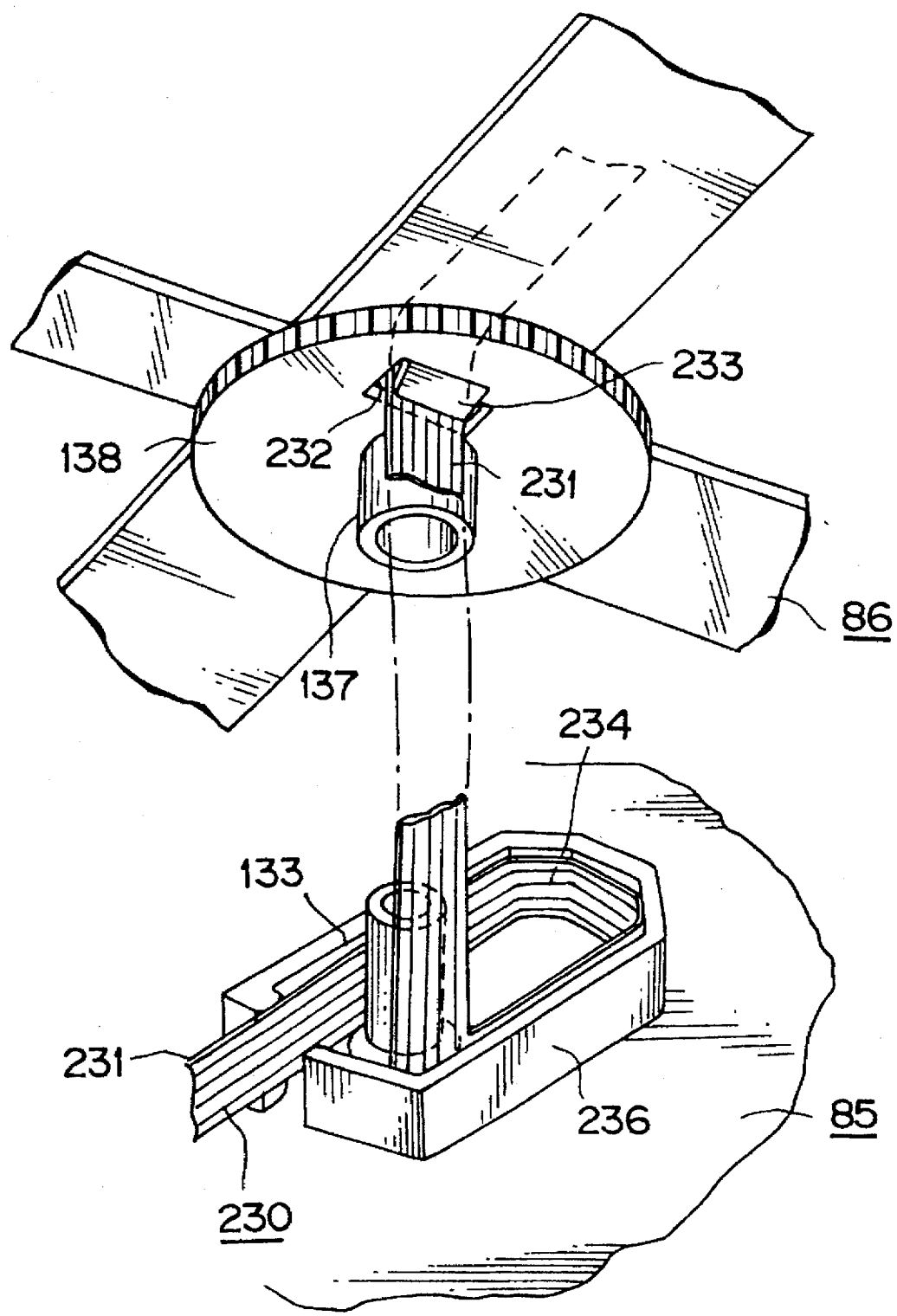
FIG. 31 is an exploded perspective view showing the state of interconnection of a flexible wiring substrate interconnecting an electronic circuit on the rotatable supporting substrate side and an electronic circuit on the stationary part supporting substrate side.

Meanwhile, the electronic circuit, such as a control circuit for controlling the driving of the first and second driving motors 136, 151 provided on the rotation supporting substrate 85 and the electronic circuit, such as a signal processing circuit provided on the stationary part supporting substrate 86, are interconnected by a flexible wiring board 230, as shown in FIG. 31. By employing the flexible wiring substrate 230, it becomes possible to exchange a large amount of signals between the electronic circuit provided on the rotation supporting substrate 85 and the electronic circuit provided on the stationary part supporting substrate 85.

The flexible printed board 230 is drawn from the lower side to the upper side of the stationary part supporting substrate 86 by having a mid portion of a stationary side extension 231 drawn out from the electronic circuit provided on the stationary part supporting substrate 86 passed through a through-hole 232 formed in the gear plate 138 mounted integrally on the pivot section 137. Meanwhile, a board thrusting piece 233 is provided in the through-hole 232 for thrusting the extension 231 against the stationary part supporting substrate 86. A part of the stationary side extension 231 drawn out above the upper surface of the stationary part supporting substrate 86 of the flexible printed board 230 is extended along the rotation supporting shaft 133 set on the mid part of the rotation supporting substrate 85. A rotation side extension 235 is drawn out from the end of the stationary side extension 231 for extending in a crossed manner relative to the stationary side extension 231. The rotation side extension 235 is connected to an electronic circuit mounted on the rotation supporting substrate 85.

A part of the connecting portion of the rotation side extension 235 to the stationary side extension 231 is designed as a coiled part 234 coiled about 180° on the outer periphery of the rotation supporting shaft 133. A flexure control wall member 236 for the flexible printed board 230 is provided on the rotation supporting substrate 85 for surrounding the coiled part 234 closed on the outer periphery of the rotation supporting shaft 133. The flexure control wall member 236 plays the role of guiding the coiled part 234 to permit smooth flexing thereof with rotation of the rotation supporting substrate 85 when the rotation supporting substrate 85 is rotated relative to the stationary part supporting substrate 86 about the rotation supporting shaft 133 as the center of rotation and to prevent the flexible printed board 230 from being damaged due to repeated flexure.

In the above-described embodiment, the disc cartridge container 30 is thrustingly supported by the disc cartridge container holder 81 when the state of replay of the optical disc 5 or 25 is reached. Alternatively, the optical disc 5 or 25 which is contained in the disc cartridge 1 or 21 and which is not reproduced may be directly thrustingly supported for preventing shaking of the optical disc 5 or 25.

Figure 32:
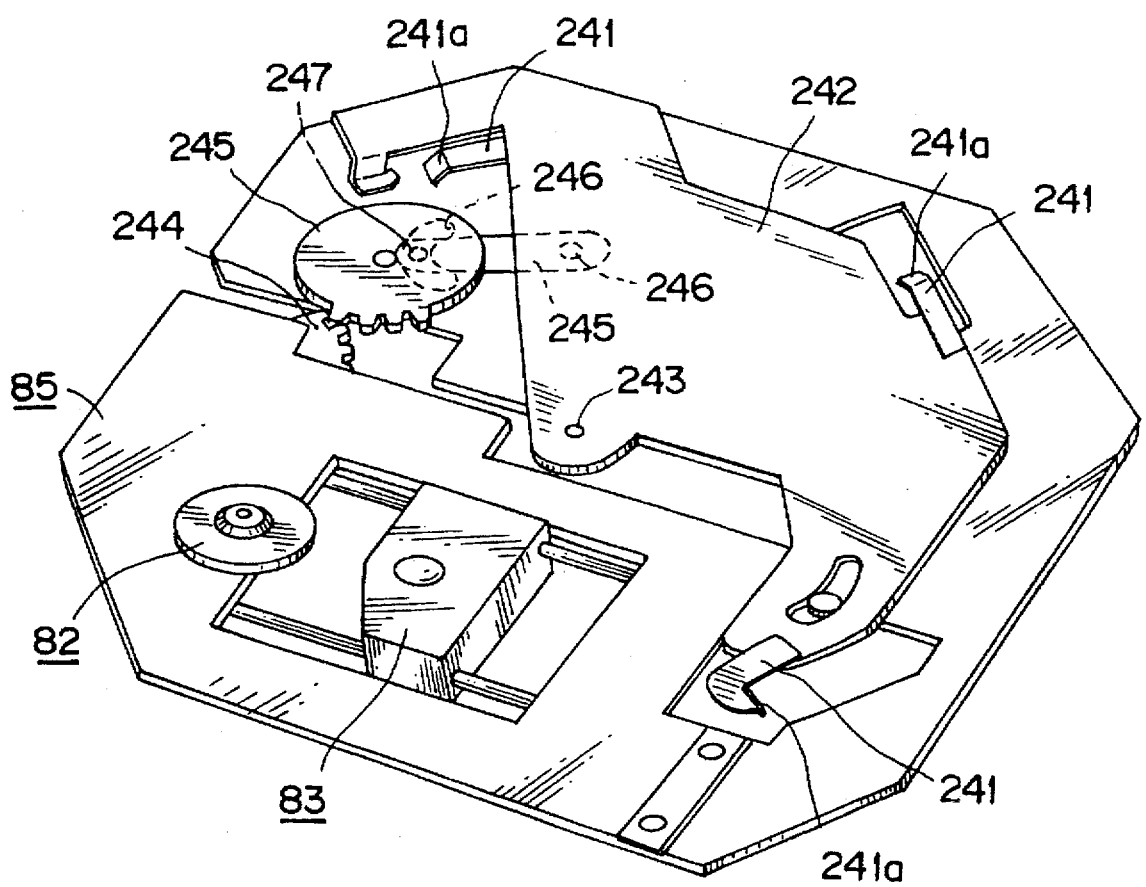
FIG. 32 is a perspective view showing a modification of a disc reproducing apparatus having an optical disc thrusting member.
Figure 33:
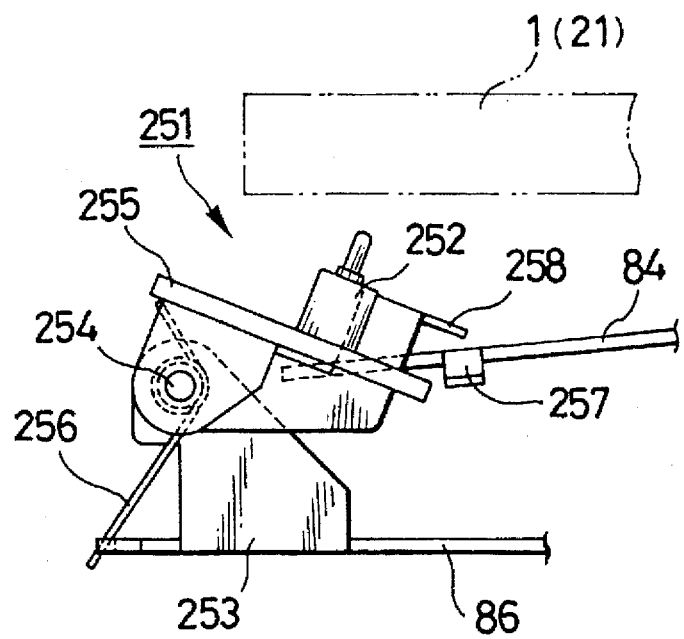
FIG. 33 is a side view showing a disc type discriminating device and showing a detection switch in its lowered position.

That is, a rotary plate 242 having plural optical disc thrusting members 241 on its upper surface facing the disc cartridge container holder 81 of the rotation supporting substrate 85 is mounted for rotation about a pivot 243, as shown in FIG. 32. On the other hand, a sector-shaped gear 244 is provided which is rotationally driven by the cam gear 152 rotationally driven by the second driving motor 151, and a second cam gear 245 is mounted on the upper surface of the rotation supporting substrate 85 which is rotated by meshing with the sector-shaped gear 244. An engagement pin 247 set on an end of a rotation actuating lever 245 pivotally mounted via a pivot 246 on the lateral side of the rotary plate 242 is engaged in a cam groove 242 formed on the major surface of the second cam gear 245. The second cam gear 245 is rotated via the sector-shaped gear 244 by the rotation of the cam gear 152 for causing the swinging movement of the rotation actuating lever 245. By such swinging movement of the lever 245, the rotary plate 242 is rotated about the pivot 243 until the optical disc thrusting members 241 are in register with the optical disc 5 or 25 which is not used for replay. A disc thrust end 241a formed by bending the distal end of the optical disc thrusting member 241 thrusts and supports the center of the optical disc 5 or 25 facing the disc table inlet opening 6 of the disc cartridge 1 or 21 for preventing the shaking of the optical disc 5 or 25.

In the above-described embodiments, explanation has been made of the disc reproducing apparatus in which the information signals are recorded on the optical disc 5 or 25 contained in the disc cartridge 1 or 21. However, the present invention may be applied to an apparatus in which information may be recorded by employing the disc cartridge 1 containing the optical disc 5 capable of re-recording the information signals. In such case, an external magnetic field head for applying an external magnetic field on the optical disc 5 is provided on the apparatus side provided with the optical pickup 83. Alternatively, the information signals may be recorded by the optical pickup 83 using the optical disc 5 in which information signals may be recorded using only the light beam.

Besides, the disc recording and/or reproducing apparatus according to the present invention may also be provided with a disc type discriminating mechanism 251 which is operatively associated with the lifting movement of the driving part supporting substrate 84 for approaching the disc cartridge 1 or 21 contained in each cartridge container section 35 of the disc cartridge container 30 for discriminating the type of the disc cartridge 1 or 21.

The disc type discriminating mechanism 251 has a detection switch 252 mounted on the stationary part supporting substrate 86 in association with disc type discriminating openings 3a, 3b and 3c provided on the lower half 3 of each disc cartridge 1 or 21 contained in each cartridge container section 35 of the disc cartridge container 30. The detection switch 252 is mounted on a rotation supporting plate 255 rotated about a rotation supporting shaft 254 mounted on a supporting piece 253 formed by partially folding the stationary part supporting substrate 86. The rotation supporting plate 255 is rotationally biased towards the stationary part supporting substrate 86 by a torsion coil spring 256 which is coiled around the rotation supporting shaft 254 and which has its one end retained by the stationary part supporting substrate 86 and its other end retained by the rotation supporting plate 255. An abutment piece 258 abutted against a rotation actuator 257 protuberantly formed on the distal side of the driving part supporting substrate 84 is protuberantly formed on one end of the rotation supporting plate 255.

Figure 34:
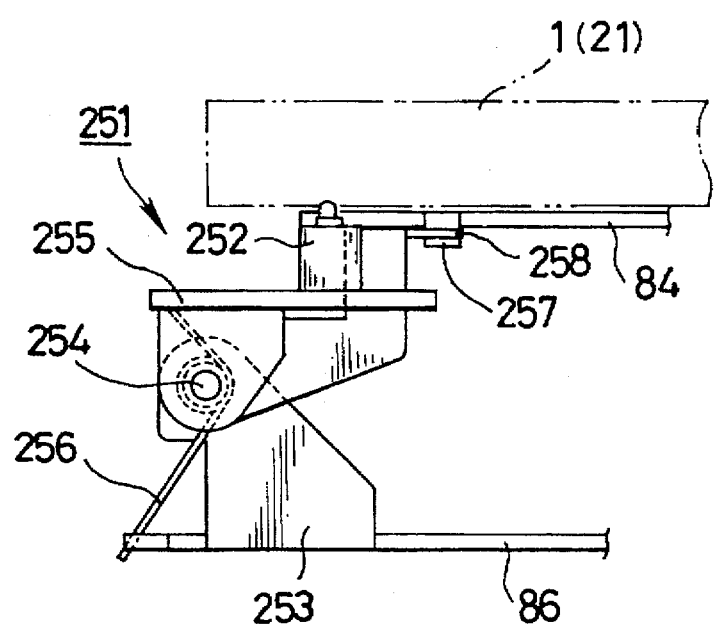
FIG. 34 is a side view showing the disc type discriminating device and showing the state in which the detection switch performs the disc cartridge type discriminating operation.

With the above-described disc type discriminating mechanism 251, when the driving part supporting substrate 84 is lifted in its rotational movement by the operation of the driving part supporting substrate lift mechanism 88, the rotation actuating piece 257 is caused to bear against the abutment piece 258. When the driving part supporting substrate 84 is raised further in its rotational movement, the rotation supporting plate 255 is rotated against the bias of the torsion coil spring 256 about the rotation supporting shaft 254 as the center of rotation. By such rotation of the rotation supporting plate 255, the detection switch 252 is pressed against the disc type discriminating openings 3a to 3c of the disc cartridge 1 or 21, as shown in FIG. 34, for discriminating the type of the disc cartridge 1 or 21 depending on the thrusting state of the detection switch 252 by the disc type discriminating openings 3a to 3c.

INDUSTRIAL APPLICABILITY

With the disc cartridge container according to the present invention, a number of disc cartridges may be contained therein so that the major surfaces of the discs contained in the cartridge main member are arrayed in one and the same plane and the disc cartridges may be contained without being stacked vertically.

Besides, with the disc cartridge container according to the present invention, the indicating section for indicating the recording contents or the like provided on the surface of the disc cartridges contained in the cartridge container sections may be checked visually from outside.

With the disc cartridge container according to the present invention, the shutter member provided on the disc cartridge may be opened or closed after housing the disc cartridge in the cartridge container section for reliably protecting the disc contained in the disc cartridge.

With the disc recording and/or reproducing apparatus according to the present invention, the shutter member provided on the disc cartridge contained in the disc container section is adapted for being opened and closed in association with the insertion into and detachment from the apparatus for assuring reliable protection of the disc contained in the disc cartridge.

With the disc recording and/or reproducing apparatus according to the present invention, the information signal may be sequentially recorded on or reproduced from the discs contained in plural disc cartridges using one and the same recording and/or reproducing apparatus.

With the disc recording and/or reproducing apparatus according to the present invention, the disc cartridges are employed which are capable of containing plural disc cartridges without stacking for simplifying and reducing the size and the thickness of the disc recording and/or reproducing apparatus itself.

In addition, with the disc recording and/or reproducing apparatus according to the present invention, the operation of approaching or separating the disc rotation driving mechanism and the information signal readout mechanism with respect to the disc as well as the maintenance of the disc rotationally driving mechanism and the information readout mechanism may be realized using only a single cam member for realization of positive operation of the movement and positioning means for the disc rotation driving mechanism and the information signal readout means and simplifying the overall structure.

What is claimed is:

1. A disc cartridge container having plural cartridge container sections each containing a disc cartridge consisting of a disc and a cartridge main member containing said disc, said cartridge container sections being arranged so that the disc cartridges are arrayed therein in a matrix array with the planar sides thereof facing the major surfaces of the discs all lying in a same plane, wherein each of said cartridge container sections comprises shutter opening/closing means for opening a shutter member mounted on each said disc cartridge simultaneously, said shutter opening/closing means also closing said shutter member in each said disc cartridge, said shutter member being adapted for opening and closing a recording/reproducing aperture provided in said cartridge main member, said recording/reproducing aperture exposing a part of the disc contained in said cartridge main member.

2. The disc cartridge container as claimed in claim 1 wherein each of said cartridge container sections comprises:

an opening for exposing said recording/reproducing aperture; an aperture for a disc drive table; a disc inlet opening for receiving said disc cartridge; and a cut-out for exposing a positioning pin engagement opening formed in said cartridge main member.

3. The disc cartridge container as claimed in claim 1 wherein said cartridge container section is formed of a light-transmitting synthetic resin to permit the disc cartridge contained in the cartridge container section to be seen from outside.

4. The disc cartridge container as claimed in claim 1 wherein as disc cartridge inserting/detachment opening is formed in one lateral surface of said cartridge container section, and wherein an opening side end of an upper wall surface and a lower wall surface of the cartridge container section facing each other and together constituting the cartridge insertion/detachment opening each having a notch formed therein.

5. The disc cartridge container as claimed in claim 1 wherein said shutter opening/closing means comprises:

a shutter opening actuating member mounted facing a front end face along which the shutter member of the disc cartridge contained in said cartridge container section is moved;

a shutter closing actuating member arranged in a side-by-side relation with respect to said shutter opening actuating member;

a rotation actuating plate mounted in association with each cartridge container section for moving said shutter opening actuating member and said shutter closing actuating member arranged as a pair, and a rotation actuating gear meshing with a gear part formed on a periphery of said rotation actuating plate for rotating said rotation actuating plate.

6. The disc cartridge container as claimed in claim 5 comprising:

a cover plate for covering said rotation actuating plate and said rotation actuating gear; and a cut-out groove formed in one side of said cover plate for receiving a rotation actuating member rotating said rotational actuating gear upon inserting said disc cartridge container into a disc recording and/or reproducing apparatus.

7. The disc cartridge container as claimed in claim 5 wherein a plurality of cam grooves are formed in said rotation actuating plate in association with said cartridge container sections, a pair of the shutter opening actuating member and the shutter closing actuating member are engaged in each cam groove, and wherein the pair of the shutter opening member and the shutter closing member are simultaneously moved by the rotation of the rotation actuating plate.

8. The disc cartridge container as claimed in claim 1 wherein a transparent window for exposing to outside a label mounted on a planar surface of the disc cartridge contained in each cartridge container section is formed in each cartridge container section.

9. A disc recording and/or reproducing apparatus comprising:

a container main member formed of a plurality of cartridge container sections each containing a disc cartridge consisting of a disc and a cartridge main member containing said disc, said cartridge container sections being arranged so that the disc cartridges are arrayed with the planar sides thereof facing the major surfaces of the disc all lying in a same plane;

each cartridge container section having a shutter opening actuating member mounted facing a front end face of the disc cartridge along which a shutter member of the disc cartridge contained in said cartridge container section is moved;

each cartridge container section having a shutter closing actuating member arranged in a side-by-side relation with respect to said shutter opening actuating member;

a rotation actuating plate mounted in association with each cartridge container section for moving said shutter opening member and said shutter closing member arranged as a pair; and a rotation actuating gear meshing with a gear part formed on a periphery of said rotation actuating plate for rotating said rotation actuating plate, and a disc cartridge container holder in which said container main member is inserted and held and which is provided with a rack gear meshing with said rotation actuating gear in association with insertion and detachment of said disc cartridge container, said rotation actuating plate being rotated by rotation of said rotation actuating gear wherein said shutter members of said disc cartridges contained in said plurality of cartridge container sections are opened and closed simultaneously.

10. The disc recording and/or reproducing apparatus as claimed in claim 9 wherein a cut-out is formed in said rotation actuating plate to permit resilient deflection of an end part of a gear part formed on the outer periphery of said rotation actuating plate.

11. The disc recording and/or reproducing apparatus as claimed in claim 9 comprising:

an ejection member adapted for being moved by the disc cartridge container loaded on said disc cartridge container holder, said ejection member being biased by biasing means for ejecting the disc cartridge container out of said disc cartridge container holder;

a locking plate moved by insertion of said disc cartridge container into said disc cartridge container holder and adapted for locking said ejection member moved to a cartridge container loading position, said locking plate being rotationally biased by biasing means; and an ejection lever rotating said locking plate against the bias of said biasing means for unlocking said ejection member.

12. The disc recording and/or reproducing apparatus as claimed in claim 11 wherein said disc cartridge holder has holding means for holding the disc cartridge container inserted into said disc cartridge container holder in its loading position.

13. The disc recording and/or reproducing apparatus as claimed in claim 9 wherein an opening end side of an upper side wall and a lower side wall facing each other and constituting a cartridge inserting/detachment opening of the disc cartridge container holder is receded towards the disc cartridge inserting side, said opening side facing the disc cartridge inserting/detachment opening of the disc cartridge container holder.

14. A disc cartridge recording and/or reproducing apparatus comprising:

a cartridge container having plural cartridge container sections each containing a disc cartridge consisting of a disc and a cartridge main member containing said disc, said cartridges are arrayed with the planar sides thereof facing the major surfaces of the discs all lying in a same plane and each of said cartridge container sections including shutter opening/closing means for opening a shutter member mounted on each said disc cartridge simultaneously and for simultaneously closing each said shutter member; and a driving part supporting substrate lift mechanism for lifting said driving part supporting substrate for approaching said disc rotation driving mechanism and said information signal recording and/or reproducing means towards and away from the disc cartridge contained in the disc cartridge container section.

15. The disc cartridge recording and/or reproducing apparatus as claimed in claim 14 comprising disc type discriminating means for discriminating the type of the disc cartridge in association with the operation of said driving part supporting substrate lift mechanism adapted for lifting said information signal recording and/or reproducing means to or from the disc cartridge contained in said cartridge container section.

16. The disc cartridge recording and/or reproducing apparatus as claimed in claim 14 comprising a driving part supporting substrate lock mechanism rotated in association with the operation of the driving part supporting substrate lift mechanism for locking the lift movement of said driving part supporting substrate at a position in which the disc rotationally driving mechanism and the information signal recording and/or reproducing means are moved to a lifted position near the disc cartridge in said cartridge container section.

17. A disc cartridge recording and/or reproducing apparatus comprising:

a cartridge container having plural cartridge container sections each containing a disc cartridge consisting of a disc and a cartridge main member containing said disc, said cartridge container sections being arranged so that the disc cartridges are arrayed with the planar sides thereof facing the major surfaces of the discs all lying in a same plane and each of said cartridge container sections including shutter opening/closing means for opening a shutter member mounted on each said disc cartridge simultaneously and for simultaneously closing each shutter member;

a rotation supporting substrate supporting a driving part support substrate carrying at least a disc rotation driving mechanism and the information signal recording and/or reproducing means adapted for being approached to and separated from the disc cartridge contained in each cartridge container section of said disc cartridge container;

a stationary supporting substrate rotatably supporting said rotation supporting substrate;

rotation driving means rotationally driving said rotation supporting substrate for moving said disc rotation driving mechanism and the information signal recording and/or reproducing means loaded on said driving part supporting substrate to a position facing one of the disc cartridges contained in the cartridge container sections of the disc cartridge container; and a driving part supporting substrate lift mechanism for lifting said driving part supporting substrate for approaching said disc rotation driving mechanism and said information signal recording and/or reproducing means carried by said driving part supporting substrate towards and away from the disc cartridge contained in the disc cartridge container section.

18. The disc cartridge recording and/or reproducing apparatus as claimed in claim 17 comprising a lock mechanism for locking said driving part supporting substrate lift mechanism when said driving part support substrate carrying said disc rotation driving mechanism and said information signal recording and/or reproducing means is moved to its raised position.

19. The disc cartridge recording and/or reproducing apparatus as claimed in claim 17 comprising a rotation supporting substrate lock mechanism for non-rotatably locking said rotation supporting substrate relative to said stationary support substrate when said rotation supporting substrate is rotated so that said disc rotation driving mechanism and said information signal recording and/or reproducing means carried by said driving part supporting substrate are moved to a position facing one of the disc cartridges contained in the cartridge container sections of the disc cartridge container.

20. The disc cartridge recording and/or reproducing apparatus as claimed in claim 17 wherein said disc rotation driving mechanism carried on said driving part supporting substrate and a driving part supporting substrate lift mechanism for lifting said driving part supporting substrate and adapted for approaching and separating the information signal recording and/or reproducing means to or from the disc cartridge contained in said cartridge container section are mounted on the rotation supporting substrate.

21. The disc cartridge recording and/or reproducing apparatus as claimed in claim 17 wherein said rotation driving mechanism comprises:

a gear plate set on said stationary support substrate and carrying a gear part on its outer periphery, said gear plate being mounted on a pivot rotatably supporting said rotation supporting substrate;

an intermediate gear rotatably carried by said rotation supporting substrate, said intermediate gear meshing with the gear part of said gear plate; and a driving motor mounted on the rotation supporting substrate adapted for rotating said intermediate gear via a driving power transmission gearing.

22. The disc cartridge recording and/or reproducing apparatus as claimed in claim 17 comprising disc cartridge thrusting and supporting means for pressing and supporting the disc cartridge container onto the disc cartridge container holder when the disc contained in one of the disc cartridges contained in plural cartridge containers of the disc cartridge container is enabled to be rotated by said disc rotation driving mechanism carried by said driving part supporting substrate.

23. The disc cartridge recording and/or reproducing apparatus as claimed in claim 17 comprising a disc contained in disc cartridges other than one of the disc cartridges contained in plural cartridge container sections of the disc cartridge container is enabled to be rotated by said rotation driving mechanism carried by said driving part supporting substrate.

24. The disc cartridge recording and/or reproducing apparatus as claimed in claim 17 further comprising a rotation supporting substrate lock mechanism for non-rotatably locking said rotation supporting substrate relative to said stationary part supporting substrate, wherein a disc thrusting and supporting mechanism for thrusting and supporting a disc contained in a disc cartridge other than the disc cartridge contained the disc rotatable by the disc rotationally and driving mechanism loaded on said driving part supporting substrate is actuated by a cam rotationally driven by a driving motor.

25. The disc cartridge recording and/or reproducing apparatus as claimed in claim 24 wherein said cam when rotated in one direction sequentially actuates said driving part supporting substrate lift mechanism, rotation supporting substrate lock mechanism and said disc thrusting and supporting mechanism.

26. The disc cartridge recording and/or reproducing apparatus as claimed in claim 24 wherein said cam when rotated in two directions sequentially actuates said driving part supporting substrate lift mechanism, rotation supporting substrate lock mechanism and said disc thrusting and supporting mechanism.

27. The disc cartridge recording and/or reproducing apparatus as claimed in claim 17 comprising:

a flexible wiring board for interconnecting an electronic circuit provided on said stationary supporting substrate for rotatably supporting said rotation supporting substrate and an electronic circuit provided on said rotation supporting substrate;

said flexible wiring board having at least a part coiled around the outer periphery of a pivot rotatably supporting said rotation supporting substrate with respect to said stationary part supporting substrate, said coiled part being surrounded by a flexible control wall member adapted for being rotated in unison with said rotation supporting substrate.

* * * * *